US008907030B2

(12) United States Patent
Demirors et al.

(10) Patent No.: US 8,907,030 B2
(45) Date of Patent: *Dec. 9, 2014

(54) ETHYLENE/ALPHA-OLEFIN INTERPOLYMER SUITABLE FOR USE IN FIBER APPLICATIONS, AND FIBERS MADE THEREFROM

(75) Inventors: Mehmet Demirors, Pearland, TX (US); Lawrence J. Effler, Rosharon, TX (US); Lonnie G. Hazlitt, Lake Jackson, TX (US); Teresa P. Karjala, Lake Jackson, TX (US); Cristina Serrat, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/820,795
(22) PCT Filed: Sep. 29, 2010
(86) PCT No.: PCT/US2010/050751
§ 371 (c)(1),
(2), (4) Date: Mar. 5, 2013
(87) PCT Pub. No.: WO2012/044293
PCT Pub. Date: Apr. 5, 2012

(65) Prior Publication Data
US 2013/0190465 A1 Jul. 25, 2013

(51) Int. Cl.
*C08F 210/16* (2006.01)
*C08F 10/00* (2006.01)
*D01F 6/30* (2006.01)
(52) U.S. Cl.
CPC ............... *C08F 210/16* (2013.01); *C08F 10/00* (2013.01); *D01F 6/30* (2013.01)
USPC ..................................... 526/123.1; 526/348.2
(58) Field of Classification Search
CPC .................................................... C08F 210/16
USPC ........................................... 526/123.1, 348.2
See application file for complete search history.

(56) References Cited

U.S. PATENT DOCUMENTS

| 4,798,081 | A | 1/1989 | Hazlitt et al. |
| 5,008,204 | A | 4/1991 | Stehling |
| 5,292,845 | A | 3/1994 | Kawasaki et al. |
| 5,847,053 | A | 12/1998 | Chum et al. |
| 8,323,569 | B2 | 12/2012 | Gillespie et al. |

(Continued)

FOREIGN PATENT DOCUMENTS

| WO | 01/60907 A1 | 8/2001 |
| WO | 02/02323 | 1/2002 |

OTHER PUBLICATIONS

L. D. Cady, "The Role of Comonomer Type and Distribution in LLDPE Product Performance," SPE Regional Technical Conference, Quaker Square Hilton, Akron, OH, 107-119 (Oct. 1-2, 1985).

(Continued)

*Primary Examiner* — Ling Choi
*Assistant Examiner* — Catherine S Branch

(57) ABSTRACT

The instant invention provides an ethylene/alpha-olefin interpolymer suitable for use in fiber applications, and fibers made therefrom. The ethylene/alpha-olefin interpolymer according to the present invention has a CDBI of less than 60%, and comprises at least two fractions in crossfractionation of the ethylene/alpha-olefin interpolymer, eluting from 85° C. to 90° C. and from 90° C. to 95° C., comprising a weight fraction ratio of >0.68 and a molecular weight homogeneity index of greater than 0.65; wherein the weight fraction ratio is the ratio of the weight of polymer in each fraction divided by the weight of polymer eluting between 95° C. and 100° C. and the molecular weight homogeneity index is the ratio of the weight average molecular weight of the polymer in the fraction divided by the weight average molecular weight of the polymer eluting between 95° C. and 100° C., and wherein the ethylene/alpha-olefin interpolymer has a density in the range of from 0.920 to 0.965 g/cm³, and a melt index ($I_2$) in the range of from 0.5 to 100 g/10 minutes, and melt flow ratio ($I_{10}/I_2$) in the range of from 5.8 to 8.

10 Claims, 7 Drawing Sheets

(56) References Cited

U.S. PATENT DOCUMENTS

2004/0158011 A1      8/2004   Jain et al.
2008/0287634 A1     11/2008   Nieto et al.
2011/0318560 A1     12/2011   Yun et al.

OTHER PUBLICATIONS

J. C. Randall in Rev. Macromol. Chem. Phys., C29, 201-317 1989.
Randall (Rev. Macromol. Chem. Phys., C29, V. 2&3, 285-297)__ 1989.
Zimm, G. H. and Stockmayer, W. H., J. Chem. Phys., 17, 1301 (1949).
Wilde, L.; Ryle, T.R.; Knobeloch, D.C.; Peat, I.R.; Determination of Branching Distributions in Polyethylene and Ethylene Copolymers, Journal of Polymer Science, 20, 441-455 (1982).
Rudin, A., Modern Methods of Polymer Characterization, John Wiley & Sons, New York (1991) 103-112.
Williams, T., and I.M. Ward, "The Construction of Polyethylene Calibration Curve for Gel Permeation Chromatography Using Polystyrene Fractions", J. Polym. Sci. Polym. Lett., 6, 621 (1968).
Randall (Rev. Macromol. Chem. Phys., C29, V. 2&3, 285-297) 1989.

ETHYLENE/ALPHA-OLEFIN INTERPOLYMER SUITABLE FOR USE IN FIBER APPLICATIONS, AND FIBERS MADE THEREFROM

FIELD OF INVENTION

The instant invention relates to an ethylene/alpha-olefin interpolymer suitable for use in fiber applications, and fibers made therefrom.

BACKGROUND OF THE INVENTION

The use of polymeric compositions such as polyolefins in producing fibers is generally known. Exemplary polyolefins include, but are not limited to, polypropylene compositions. Such fibers may be formed into fabrics, e.g. woven fabrics or non-woven fabrics. Different techniques may be employed to form such fabrics. Such techniques are generally known to persons of ordinary skill in the art.

Despite the research efforts in developing compositions suitable for fibers, there is still a need for a polyethylene composition having improved properties. Furthermore, there is still a need for a process for producing a polyethylene composition having improved properties.

SUMMARY OF THE INVENTION

The instant invention provides an ethylene/alpha-olefin interpolymer suitable for use in fiber applications, and fibers made therefrom.

In one embodiment, the instant invention provides an ethylene/alpha-olefin interpolymer, wherein the ethylene/alpha-olefin interpolymer has a CDBI of less than 60%, and wherein said ethylene/alpha-olefin interpolymer comprises at least two fractions in crossfractionation of the ethylene/alpha-olefin interpolymer, eluting from 85° C. to 90° C. and from 90° C. to 95° C., comprising a weight fraction ratio of >0.68 and a molecular weight homogeneity index of greater than 0.65; wherein the weight fraction ratio is the ratio of the weight of polymer in each fraction divided by the weight of polymer eluting between 95° C. and 100° C. and the molecular weight homogeneity index is the ratio of the weight average molecular weight of the polymer in the fraction divided by the weight average molecular weight of the polymer eluting between 95° C. and 100° C., and wherein said ethylene/alpha-olefin interpolymer has a density in the range of from 0.920 to 0.965 g/cm$^3$, and a melt index ($I_2$) in the range of from 0.5 to 100 g/10 minutes, and melt flow ratio ($I_{10}/I_2$) in the range of from 5.8 to 8.

In another alternative embodiment, the instant invention further provides a process to make an ethylene/alpha-olefin interpolymer comprising the steps of contacting ethylene with at least one alpha-olefin under suitable polymerization conditions with a multi-constituent catalyst composition to form an ethylene/alpha-olefin interpolymer, wherein the ethylene/alpha-olefin interpolymer has a CDBI of less than 60%, and wherein said ethylene/alpha-olefin interpolymer comprises at least two fractions in crossfractionation of the ethylene/alpha-olefin interpolymer, eluting from 85° C. to 90° C. and from 90° C. to 95° C., comprising a weight fraction ratio of >0.68 and a molecular weight homogeneity index of greater than 0.65; wherein the weight fraction ratio is the ratio of the weight of polymer in each fraction divided by the weight of polymer eluting between 95° C. and 100° C. and the molecular weight homogeneity index is the ratio of the weight average molecular weight of the polymer in the fraction divided by the weight average molecular weight of the polymer eluting between 95° C. and 100° C., and wherein said ethylene/alpha-olefin interpolymer has a density in the range of from 0.920 to 0.965 g/cm$^3$, and a melt index ($I_2$) in the range of from 0.5 to 100 g/10 minutes, and melt flow ratio ($I_{10}/I_2$) in the range of from 5.8 to 8.

In an alternative embodiment, the instant invention further provides a fiber comprising an ethylene/alpha-olefin interpolymer, wherein the ethylene/alpha-olefin interpolymer has a CDBI of less than 60%, and wherein said ethylene/alpha-olefin interpolymer comprises at least two fractions in crossfractionation of the ethylene/alpha-olefin interpolymer, eluting from 85° C. to 90° C. and from 90° C. to 95° C., comprising a weight fraction ratio of >0.68 and a molecular weight homogeneity index of greater than 0.65; wherein the weight fraction ratio is the ratio of the weight of polymer in each fraction divided by the weight of polymer eluting between 95° C. and 100° C. and the molecular weight homogeneity index is the ratio of the weight average molecular weight of the polymer in the fraction divided by the weight average molecular weight of the polymer eluting between 95° C. and 100° C., and wherein said ethylene/alpha-olefin interpolymer has a density in the range of from 0.920 to 0.965 g/cm$^3$, and a melt index ($I_2$) in the range of from 0.5 to 100 g/10 minutes, and melt flow ratio ($I_{10}/I_2$) in the range of from 5.8 to 8.

In an alternative embodiment, the instant invention provides an ethylene/alpha-olefin interpolymer, method of producing the same, and fibers made therefrom, in accordance with any of the preceding embodiments, except that the ethylene/alpha-olefin interpolymer has an average $M_v$ and a valley temperature between the low crystalline fraction and high crystalline fraction, $T_{hc}$, such that the average $M_v$ for a fraction above $T_{hc}$ from ATREF divided by average $M_v$ of the whole ethylene/alpha-olefin interpolymer from ATREF ($M_{hc}/M_p$) is less than 1.3.

In an alternative embodiment, the instant invention provides an ethylene/alpha-olefin interpolymer, method of producing the same, and fibers made therefrom, in accordance with any of the preceding embodiments, except that the ethylene/alpha-olefin interpolymer has a density in the range of from 0.925 to 0.965 g/cm$^3$.

In an alternative embodiment, the instant invention provides an ethylene/alpha-olefin interpolymer, method of producing the same, and fibers made therefrom, in accordance with any of the preceding embodiments, except that the ethylene/alpha-olefin interpolymer has a melt index ($I_2$) in the range of 0.5 to 50 g/10 minutes.

In an alternative embodiment, the instant invention provides an ethylene/alpha-olefin interpolymer, method of producing the same, and fibers made therefrom, in accordance with any of the preceding embodiments, except that the ethylene/alpha-olefin interpolymer is heterogeneously branched.

In an alternative embodiment, the instant invention provides an ethylene/alpha-olefin interpolymer, method of producing the same, and fibers made therefrom, in accordance with any of the preceding embodiments, except that the ethylene/alpha-olefin interpolymer has a CDBI of less than 55%.

In an alternative embodiment, the instant invention provides an ethylene/alpha-olefin interpolymer, method of producing the same, and fibers made therefrom, in accordance with any of the preceding embodiments, except that the ethylene/alpha-olefin interpolymer has long chain branches less than 1 per 1000 C atoms.

In an alternative embodiment, the instant invention provides an ethylene/alpha-olefin interpolymer, method of producing the same, and fibers made therefrom, in accordance with any of the preceding embodiments, except that the ethylene/alpha-olefin interpolymer has a molecular weight distribution, $M_w/M_n$, of less than about 5.

In an alternative embodiment, the instant invention provides an ethylene/alpha-olefin interpolymer, method of producing the same, and fibers made therefrom, in accordance with any of the preceding embodiments, except that the multi-constituent catalyst composition comprises the reaction product of:

(A) a magnesium halide prepared by contacting:
(1) at least one hydrocarbon soluble magnesium component represented by the general formula R"R'Mg.xAlR'3 wherein each R" and R' are alkyl groups;
(2) at least one non-metallic or metallic halide source under conditions such that the reaction temperature does not exceed a temperature in the range of from 20 to 40, for example, it does not exceed about 40° C.; or in the alternative, it does not exceed about 35° C.;

(B) at least one transition metal compound represented by the formula $Tm(OR)_y X_{y-x}$ wherein Tm is a metal of Groups IVB, VB, VIB, VIIB or VIII of the Periodic Table; R is a hydrocarbyl group having from 1 to about 20, for example from 1 to about 10 carbon atoms; X is a halide, and $_y$ and $_x$ are integers and their sum is equal to 4, and (C) an additional halide source to provide the desired excess X:Mg ratio; wherein additional halide source may be an organo halide compound of Group IIIA metal including, for example, those represented by the formula $R'_y MX_z$; wherein M is a metal from Group IIIA of the Periodic Table of Elements, for example aluminum or boron; each R' is independently an alkyl group having from 1 to 20, for example from 1 to 10, or in the alternative, from 2 to 8, carbon atoms; X is a halogen atom, for example chlorine; $_y$ and $_z$ each independently have a value from 1 to a value equal to the valence of M. Particularly suitable organo halide compounds include, for example, ethylaluminum dichloride, ethylaluminum sequichloride; diethylaluminum chloride; isobutylaluminum dichloride; diisobutylaluminum chloride; octylaluminum dichloride; and combinations of 2 or more thereof.

In an alternative embodiment, the instant invention provides an ethylene/alpha-olefin interpolymer, method of producing the same, and fibers made therefrom, in accordance with any of the preceding embodiments, except that the sum of the weights of all three fractions of polymer eluting between 85° C. and 100° C. is greater than 60 wt % of the ethylene/alpha-olefin interpolymer.

In an alternative embodiment, the instant invention provides an ethylene/alpha-olefin interpolymer, method of producing the same, and fibers made therefrom, in accordance with any of the preceding embodiments, except that the weight average $M_w$ of the ethylene/alpha-olefin interpolymer is greater than 125,000 g/mol.

BRIEF DESCRIPTION OF THE DRAWINGS

For the purpose of illustrating the invention, there is shown in the drawings a form that is exemplary; it being understood, however, that this invention is not limited to the precise arrangements and illustrations shown.

DETAILED DESCRIPTION OF THE INVENTION

Figure 1:
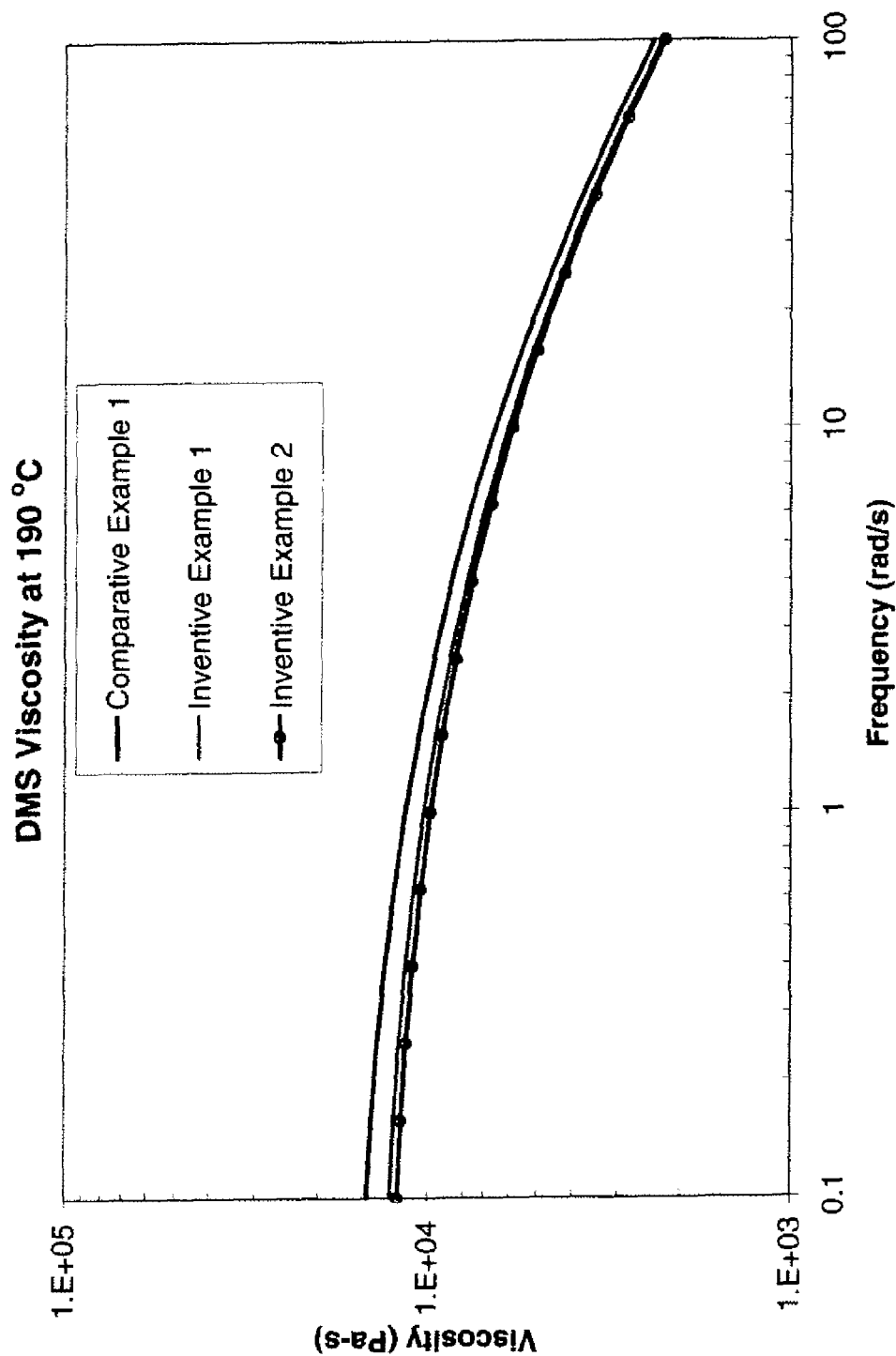
FIG. 1 is a graph illustrating the dynamic mechanical spectroscopy complex viscosity data versus frequency for Comparative Example 1 and Inventive Examples 1 and 2.
Figure 2:
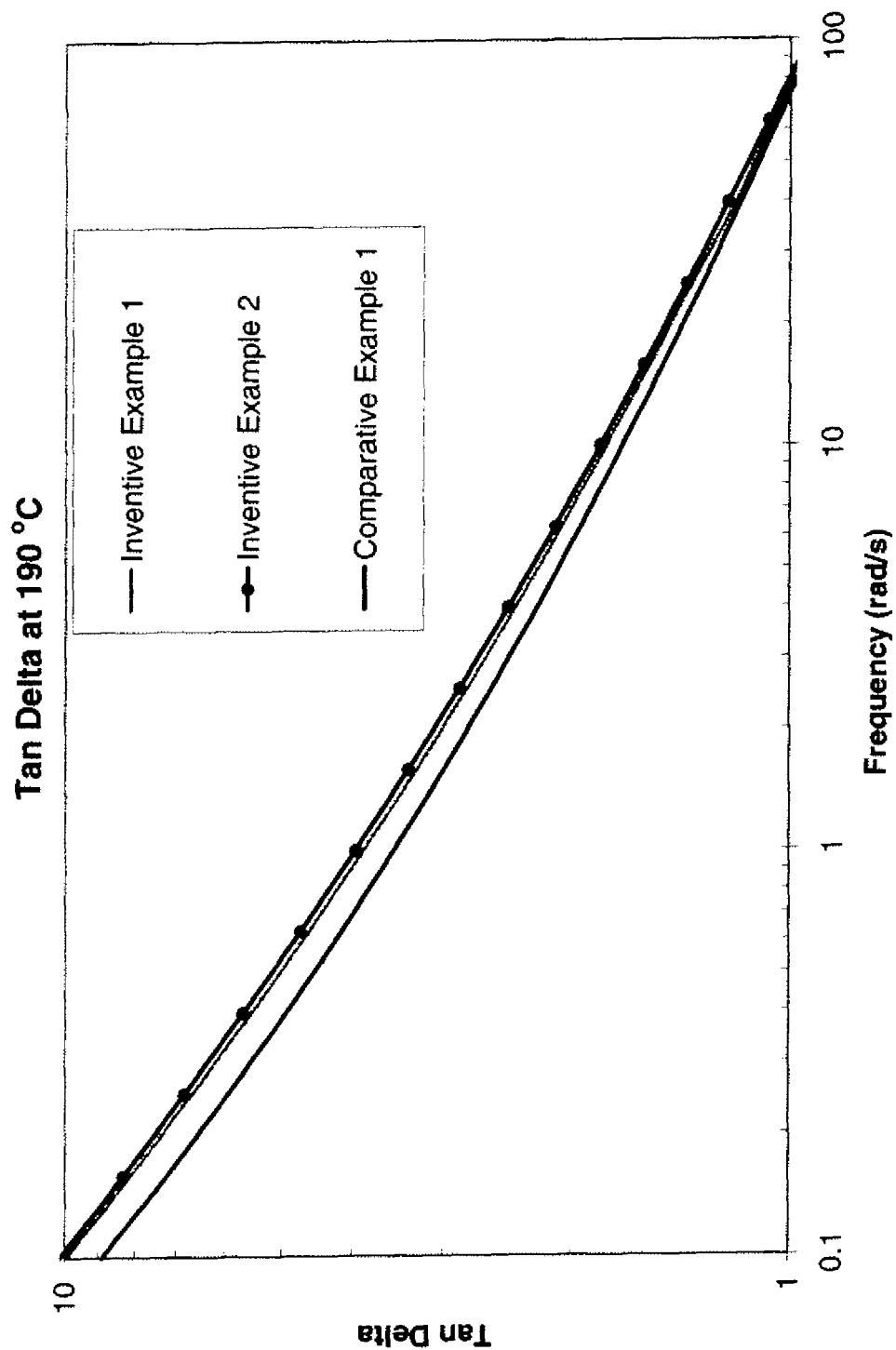
FIG. 2 is a graph illustrating the dynamic mechanical spectroscopy tan delta data versus frequency for Comparative Example 1 and Inventive Examples 1 and 2.
Figure 3:
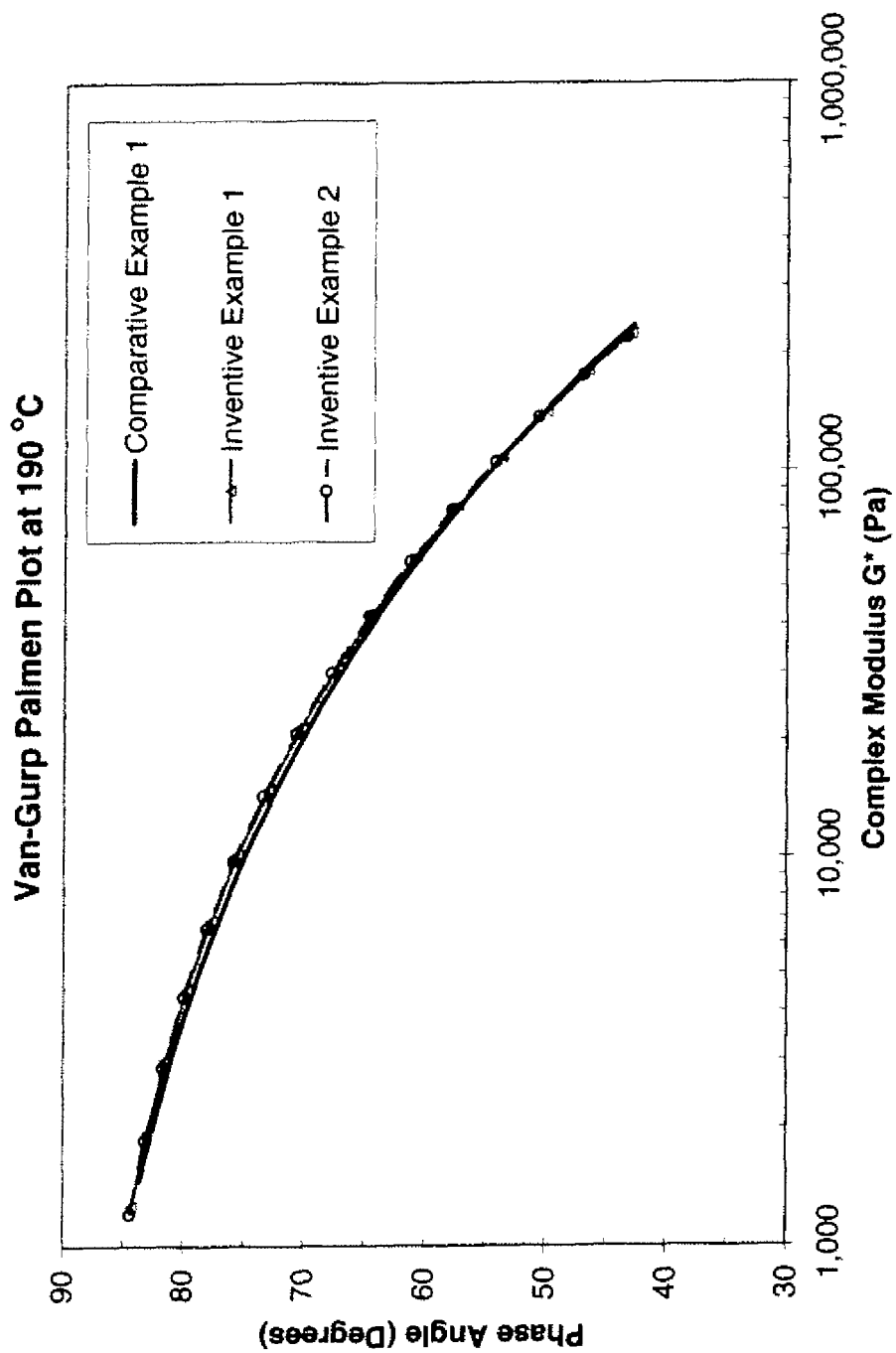
FIG. 3 is a graph illustrating the dynamic mechanical spectroscopy data of phase angle vs. complex modulus (Van-Gurp Palmen plot) for Comparative Example 1 and Inventive Examples 1 and 2.
Figure 4:
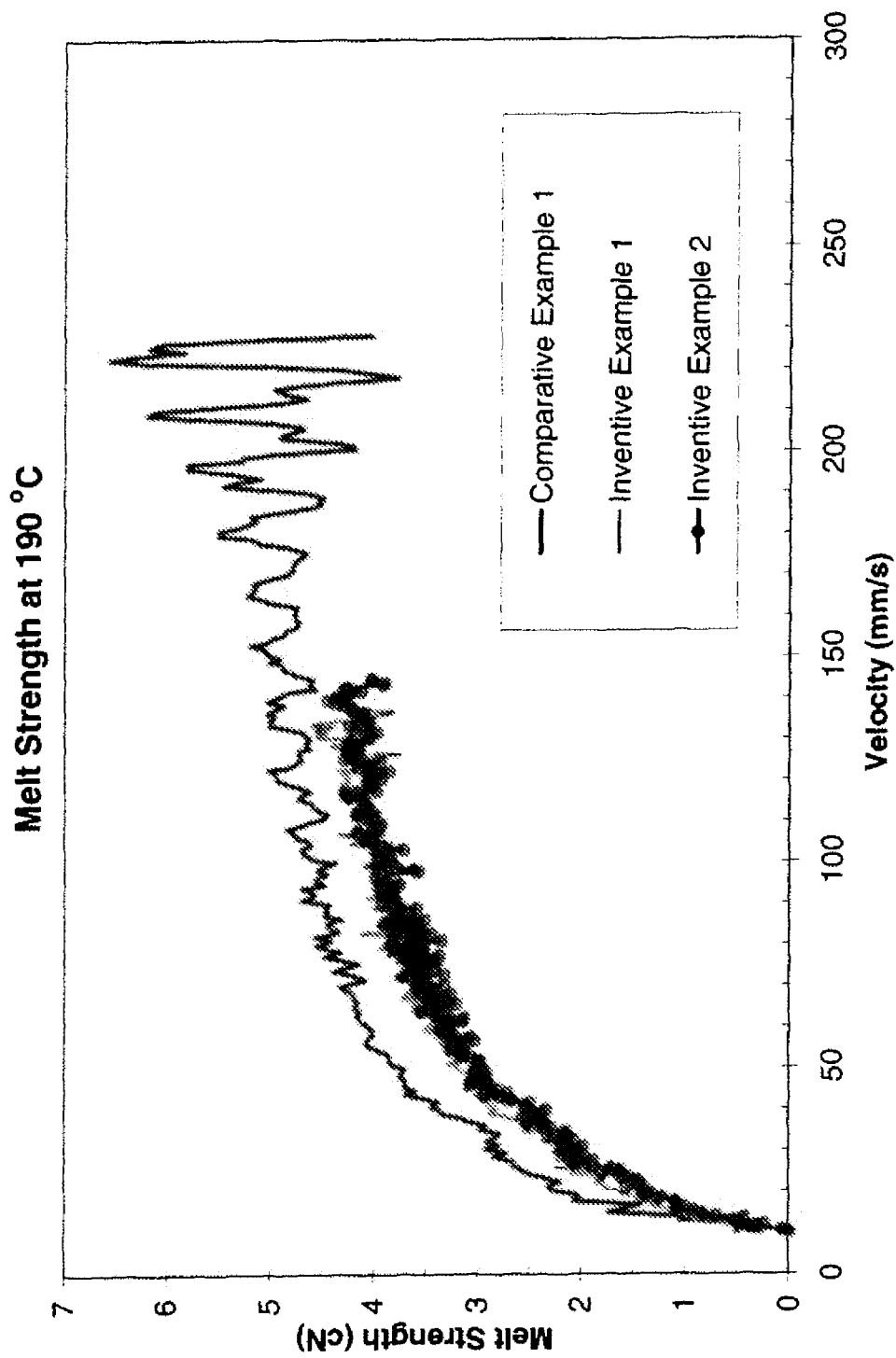
FIG. 4 is a graph illustrating the melt strength data at 190° C. for Comparative Example 1 and Inventive Examples 1 and 2.
Figure 5:
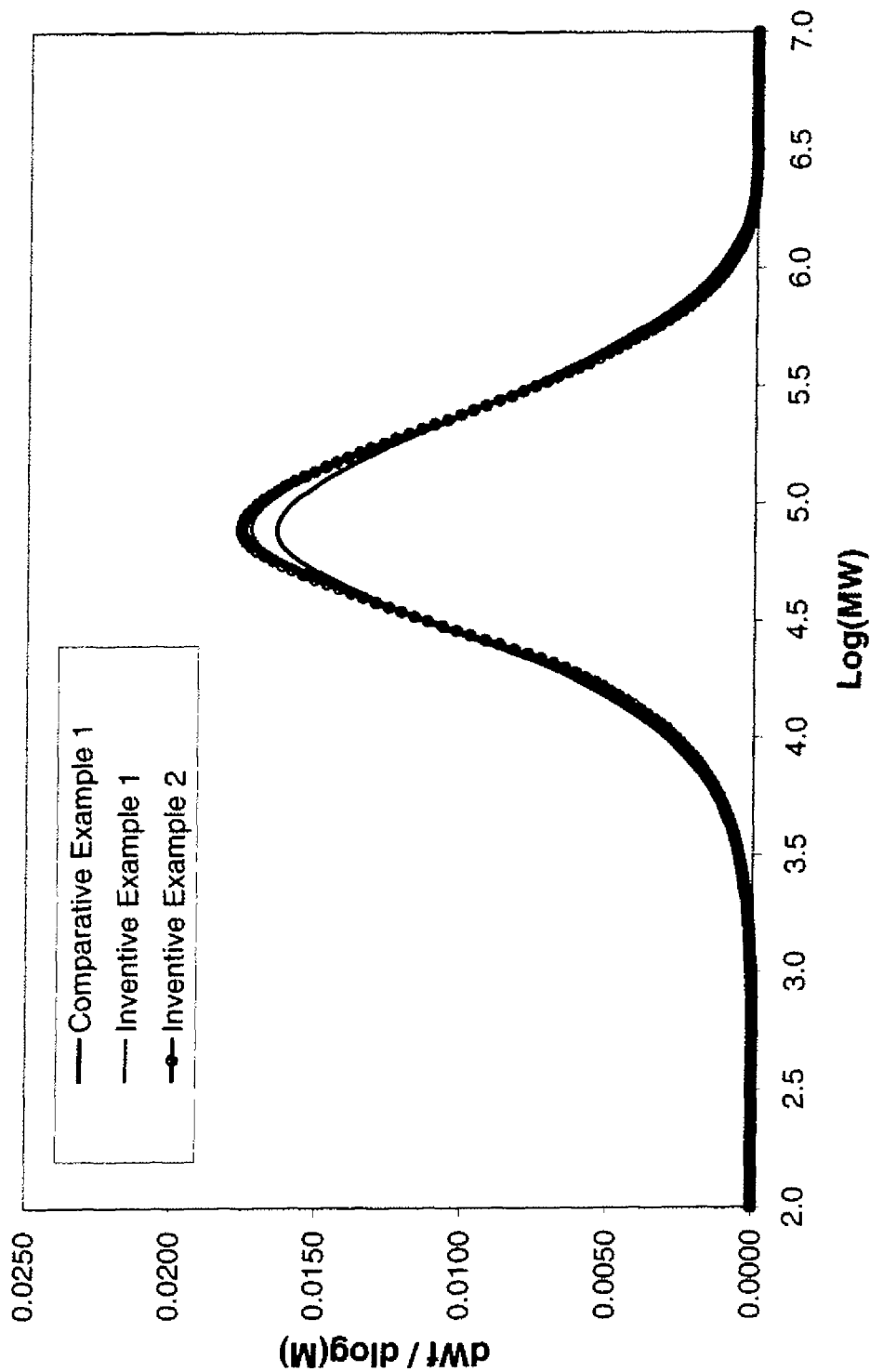
FIG. 5 is a graph illustrating the Conventional GPC data for Comparative Example 1 and Inventive Examples 1 and 2.

The instant invention provides an ethylene/alpha-olefin interpolymer suitable for use in fiber applications, and fibers made therefrom. The inventive ethylene/alpha-olefin interpolymer has a CDBI of less than 60%, and comprises at least two fractions in crossfractionation of the ethylene/alpha-olefin interpolymer, eluting from 85° C. to 90° C. and from 90° C. to 95° C., comprising a weight fraction ratio of >0.68 and a molecular weight homogeneity index of greater than 0.65; wherein the weight fraction ratio is the ratio of the weight of polymer in each fraction divided by the weight of polymer eluting between 95° C. and 100° C. and the molecular weight homogeneity index is the ratio of the weight average molecular weight of the polymer in the fraction divided by the weight average molecular weight of the polymer eluting between 95° C. and 100° C. Furthermore, the inventive ethylene/alpha-olefin interpolymer has a density in the range of from 0.920 to 0.965 g/cm$^3$, and a melt index ($I_2$) in the range of from 0.5 to 100 g/10 minutes, and melt flow ratio ($I_{10}/I_2$) in the range of from 5.8 to 8.

The inventive ethylene/alpha-olefin interpolymer has a low melt index ratio ($I_{10}/I_2$), and comprises less high molecular weight material in its high crystalline fraction, which can be measured by the ratio of the high crystalline viscosity molecular weight divided by the average viscosity molecular weight of the whole ethylene/alpha-olefin interpolymer, $M_{hc}/M_p$. The crossfractionation results indicate that the inventive ethylene/alpha-olefin interpolymer has a more uniform weight average molecular weight for the fractions eluting between 85° C. and 100° C. This uniformity is expressed by reporting the molecular weight of the lower temperature fractions (85° C. and 90° C. and 90° C. and 95° C.) as a ratio of or relative to the molecular weight of the 95° C. and 100° C. fraction, wherein the ratio is greater than 0.65.

The inventive ethylene/alpha-olefin interpolymer has an average $M_v$ and a valley temperature between the low crystalline fraction and high crystalline fraction, $T_{hc}$, such that the average $M_v$ for a fraction above $T_{hc}$ from ATREF divided by average $M_v$ of the whole ethylene/alpha-olefin interpolymer from ATREF ($M_{hc}/M_p$) is less than 1.3; for example, less than 1.25.

The inventive ethylene/alpha-olefin interpolymers are relatively inhomogeneous (or heterogeneous) ethylene polymers that possess short chain branches and that are characterized by a relatively low composition distribution breadth index (CDBI). That is, the inventive ethylene/alpha-olefin interpolymer has a comonomer distribution index (CDBI) in the range of from less than 60%, for example, in the range of from less than 50%, but usually include a measurable high density (high crystalline) polymer fraction.

The inventive ethylene/alpha-olefin interpolymer has a density in the range of from 0.920 to 0.965 g/cm$^3$, for example, in the range of from 0.920 to 0.955 g/cm$^3$; or in the alternative, in the range of from 0.930 to 0.965 g/cm$^3$.

The inventive ethylene/alpha-olefin interpolymer has a melt index ($I_2$) in the range of from 0.5 to 100 g/10 minutes, for example, in the range of from 0.5 to 50 g/10 minutes; or in the alternative, in the range of from 0.5 to 50 g/10 minutes.

The inventive ethylene/alpha-olefin interpolymer has a melt flow ratio ($I_{10}/I_2$) in the range of from 5.8 to 8, for example, in the range of from 6 to 8.

The inventive ethylene/alpha-olefin interpolymer has a molecular weight ($M_w$) in the range of from greater than 120,000 g/mole, for example, in the range of from 120,000 to 250,000 g/moles.

The inventive ethylene/alpha-olefin interpolymer has a molecular weight distribution ($M_w/M_n$) (measured according to the conventional GPC method) in the range of from less than 4; for example, less than 3.7; or in the alternative, in the range of from 2.5 to 3.7.

The inventive ethylene/alpha-olefin interpolymer may comprise less than 20 percent by weight of units derived from one or more α-olefin comonomers. All individual values and subranges from less than 18 weight percent are included herein and disclosed herein; for example, the inventive ethylene/alpha-olefin interpolymer may comprise less than 15 percent by weight of units derived from one or more α-olefin comonomers; or in the alternative, the inventive ethylene/alpha-olefin interpolymer may comprise less than 10 percent by weight of units derived from one or more α-olefin comonomers; or in the alternative, the inventive ethylene/alpha-olefin interpolymer may comprise from 1 to 20 percent by weight of units derived from one or more α-olefin comonomers; or in the alternative, the inventive ethylene/alpha-olefin interpolymer may comprise from 1 to 10 percent by weight of units derived from one or more α-olefin comonomers.

The inventive ethylene/alpha-olefin interpolymer may comprise less than 10 percent by moles of units derived from one or more α-olefin comonomers. All individual values and subranges from less than 10 mole percent are included herein and disclosed herein; for example, the inventive ethylene/alpha-olefin interpolymer may comprise less than 7 percent by moles of units derived from one or more α-olefin comonomers; or in the alternative, the inventive ethylene/alpha-olefin interpolymer may comprise less than 4 percent by moles of units derived from one or more α-olefin comonomers; or in the alternative, the inventive ethylene/alpha-olefin interpolymer may comprise less than 3 percent by moles of units derived from one or more α-olefin comonomers; or in the alternative, the inventive ethylene/alpha-olefin interpolymer may comprise from 0.5 to 10 percent by moles of units derived from one or more α-olefin comonomers; or in the alternative, the inventive ethylene/alpha-olefin interpolymer may comprise from 0.5 to 3 percent by moles of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The inventive ethylene/alpha-olefin interpolymer may comprise at least 80 percent by weight of units derived from ethylene. All individual values and subranges from at least 80 weight percent are included herein and disclosed herein; for example, the inventive ethylene/alpha-olefin interpolymer may comprise at least 82 percent by weight of units derived from ethylene; or in the alternative, the inventive ethylene/alpha-olefin interpolymer may comprise at least 85 percent by weight of units derived from ethylene; or in the alternative, the inventive ethylene/alpha-olefin interpolymer may comprise at least 90 percent by weight of units derived from ethylene; or in the alternative, the inventive ethylene/alpha-olefin interpolymer may comprise from 80 to 99 percent by weight of units derived from ethylene; or in the alternative, the inventive ethylene/alpha-olefin interpolymer may comprise from 90 to 99 percent by weight of units derived from ethylene.

The inventive ethylene/alpha-olefin interpolymer may comprise at least 90 percent by moles of units derived from ethylene. All individual values and subranges from at least 90 mole percent are included herein and disclosed herein; for example, the inventive ethylene/alpha-olefin interpolymer may comprise at least 93 percent by moles of units derived from ethylene; or in the alternative, the inventive ethylene/alpha-olefin interpolymer may comprise at least 96 percent by moles of units derived from ethylene; or in the alternative, the inventive ethylene/alpha-olefin interpolymer may comprise at least 97 percent by moles of units derived from ethylene; or in the alternative, the inventive ethylene/alpha-olefin interpolymer may comprise from 90 to 99.5 percent by moles of units derived from ethylene; or in the alternative, the inventive ethylene/alpha-olefin interpolymer may comprise from 97 to 99.5 percent by moles of units derived from ethylene.

Any conventional polymerization processes may be employed to produce the inventive ethylene/alpha-olefin interpolymers. Such conventional polymerization processes include, but are not limited to, solution polymerization process, gas phase polymerization process, slurry phase polymerization process, and combinations thereof using one or more conventional reactors e.g. loop reactors, isothermal reactors, fluidized bed gas phase reactors, stirred tank reactors, batch reactors in parallel, series, and/or any combinations thereof.

The inventive ethylene/alpha-olefin interpolymer may, for example, be produced via solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 150 to 300° C.; for example, from 160 to 190° C., and at pressures in the range of from 300 to 1000 psi; for example, from 400 to 750 psi. The residence time in solution phase polymerization process is typically in the range of from 2 to 30 minutes; for example, from 10 to 20 minutes. Ethylene, solvent, multi-constituent catalyst composition, and optionally one or more comonomers are fed continuously to the reactor. Exemplary multi-constituent catalyst compositions in these embodiments include, for example, Ziegler-Natta catalysts, as described herein. Exemplary solvents include, but are not limited to, isoparaffins. For example, such solvents are commercially available under the name ISOPAR E from ExxonMobil Chemical Co., Houston, Tex. The resultant mixture of the inventive ethylene/alpha-olefin interpolymer and solvent is then removed from the reactor and the inventive ethylene/ alpha-olefin interpolymer is isolated. Solvent is typically recovered via a solvent recovery unit, i.e. heat exchangers and vapor liquid separator drum, and is then recycled back into the polymerization system.

Low reactor temperature is a requirement of the present invention and is important in facilitating the narrowing of the molecular weight distribution. Reactor temperature of 175° C. yielded a product with narrow molecular weight distribution without significantly reducing the production output (lb/hr).

In one embodiment, the inventive ethylene/alpha-olefin interpolymer may be prepared using a multi-constituent catalyst composition, as described herein, suitable for (co)polymerizing ethylene and one or more α-olefin comonomers, e.g. 1-octene, via a solution phase polymerization process in a loop reactor in accordance with the following procedure. All raw materials (ethylene, 1-octene) and the process solvent (an isoparaffinic solvent, for example ISOPAR E) are purified with molecular sieves before introduction into the reaction environment. Hydrogen is supplied as a high purity grade and is not further purified. The reactor monomer feed (ethylene) stream is pressurized via a mechanical compressor to a pressure that is above the reaction pressure, e.g. 750 psig. The solvent and comonomer (1-octene) feed is pressurized via a mechanical positive displacement pump to a pressure that is above the reaction pressure, e.g. 750 psig. The individual catalyst components are manually batch diluted to specified component concentrations with purified solvent (ISOPAR E) and pressured to a pressure that is above the reaction pressure, e.g. 750 psig. All reaction feed flows are measured with mass flow meters and independently controlled with computer automated valve control systems.

The continuous solution polymerization reactor may consist of a liquid full, non-adiabatic, isothermal, circulating, loop. Independent control of all fresh solvent, monomer, comonomer, hydrogen, and catalyst component feeds is possible. The combined solvent, monomer, comonomer and hydrogen feed is temperature controlled to anywhere between 5° C. to 50° C. and typically 40° C. by passing the feed stream through a heat exchanger. The fresh comonomer feed to the polymerization reactor is aligned to add comonomer to the recycle solvent. The total fresh feed to the polymerization reactor is injected into the reactor at, for example, two locations roughly with equal reactor volumes between each injection location. The fresh feed is controlled typically with each injector, for example, receiving half of the total fresh feed mass flow. The catalyst components are injected into the polymerization reactor through, for example, a specially designed injection inlet device and are combined into one mixed procatalyst/cocatalyst feed stream prior to injection into the reactor. The procatalyst component feed is computer controlled to maintain the reactor monomer concentration at a specified target. The cocatalyst component is fed based on calculated specified molar ratios to the procatalyst component. Immediately following each fresh injection location (either feed or catalyst), the feed streams are mixed with the circulating polymerization reactor contents with static mixing elements such as Kenics static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop can be provided by a screw pump. The effluent from the polymerization reactor (containing solvent, monomer, comonomer, hydrogen, catalyst components, and molten polymer) exits the reactor loop and enters a zone where it is contacted with a deactivating and acid scavenging agent (typically calcium stearate and the accompanying water of hydration) to stop the reaction and scavenge hydrogen chloride. In addition, various additives such as anti-oxidants can be added at this point. The stream then goes through another set of static mixing elements such as Kenics static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then passes through a pressure let down control valve, which is responsible for maintaining the pressure of the reactor at a specified target. The stream then enters a two stage separation and devolatilization system where the polymer is removed from the solvent, hydrogen, and unreacted monomer and comonomer. Impurities are removed from the recycled before entering the reactor again. The separated and devolatilized polymer melt is, for example, pumped through a die specially designed for underwater pelletization, cut into uniform solid pellets, dried, and transferred into a hopper. After validation of initial polymer properties, the solid polymer pellets are transferred to storage devices.

The portions removed in the devolatilization step may be recycled or destroyed. For example, most of the solvent is recycled back to the reactor after passing through purification beds. This recycled solvent can still have unreacted co-monomer in it that is fortified with fresh co-monomer prior to re-entry to the reactor. This recycle solvent can still have some hydrogen which is then fortified with fresh hydrogen.

In one embodiment, the inventive ethylene/alpha-olefin interpolymer may be prepared using a multi-constituent catalyst system, as described herein, suitable for (co)polymerizing ethylene and one or more α-olefin comonomers, e.g. 1-octene, via a solution phase polymerization process in two adiabatic spherical reactors, linked together in series in accordance to the following procedure. The ethylene monomer, 1-octene comonomer, and hydrogen are combined with a solvent, e.g. an isoparaffinic solvent such as ISOPAR E. Impurities such as water, carbon dioxide, sulfurous compounds are removed from the feed streams, and the feed streams are cooled to temperature in the range of 5° C. to 60° C., for example, approximately 13° C., before entering the reactor. The majority, approximately from 85 to 90 percent, of the reaction may occur in the first spherical reactor. The mixing may be achieved via circulating the polymer/procatalyst/cocatalyst/solvent/ethylene/co-monomer/hydrogen solution with one or more agitators equipped with mixing blades. The feed (ethylene/comonomer/solvent/hydrogen) may, for example, enter the reactor from the bottom and the procatalyst/cocatalyst may, for example, enter the reactor separately from the feed and also from the bottom. The first reactor temperature is in the range of from 160° C. to 190° C., for example, approximately 175° C., and the reactor pressure is in the range of from 400 psi to 1000 psi, for example, approximately 500 psi. The temperature of the second reactor, in series with the first, increases to a temperature in the range of from 175° C. to 210° C., for example, approximately 202° C. with approximately from 10 to 15 percent of the remaining reaction occurring and no additional catalyst or monomers are added. Procatalyst/Co-catalyst Al/Ti molar feed ratio is set at value in the range of 0.5:1 to 3:1. The average reactor residence time is in the range of from 2 to 30 minutes, for example, approximately 8 minutes per spherical reactor prior to termination post-reactor by a fluid specially designed for that purpose. After the polymer solution leaves the reactor, the solvent with unconverted ethylene monomer and 1-octene comonomer may be removed from the polymer solution via a two stage devolatilizer system, and then recycled. Impurities may be removed from the recycled stream before entering the reactor again. The polymer melt may, for example, be pumped through a die specially designed for underwater pelletization. The pellets are transferred to classifier screens to remove over and undersize particles. The finished pellets are then transferred to storage devices.

Multi-Constituent Catalyst

The multi-constituent catalyst system includes a Ziegler-Natta catalyst composition including a magnesium and titanium containing procatalyst and a cocatalyst. The procatalyst is a Ziegler Natta catalyst including a titanium compound supported on $MgCl_2$. The cocatalyst is a triethylaluminum. The procatalyst may have a Ti:Mg ratio between 1.0:40 to 5.0:40, for example, 3.0:40. The procatalyst and the cocatalyst components can be contacted either before entering the reactor or in the reactor. The procatalyst may, for example, be any other titanium based Ziegler Natta catalyst. The Al:Ti molar ratio of cocatalyst component to procatalyst component can be from 0.5:1 to 3:1.

Low Al/Ti ratio is important because it facilitates the narrowing of the molecular weight distribution and the lowering of the melt flow ratio $I_{10}/I_2$. The multi-constituent catalyst composition with a Ti:Mg ratio between 1.0:40 to 5.0:40, for example, 3.0:40, an Al/Ti ratio of in the range of from 0.5:1 to 3:1 have yielded a product with narrow molecular weight distribution, low melt flow ratio $I_{10}/I_2$ without significantly affecting reactor stability.

The multi-constituent catalyst system includes a Ziegler-Natta catalyst composition including a magnesium and titanium containing procatalyst and a cocatalyst. The procatalyst may, for example, comprise the reaction product of magnesium dichloride, an alkylaluminum dihalide, and a titanium alkoxide.

The procatalyst comprises the reaction product of:
(A) a magnesium halide prepared by contacting:
  (1) at least one hydrocarbon soluble magnesium component represented by the general formula R"R'Mg.xAlR'3 wherein each R" and R' are alkyl groups;
  (2) at least one non-metallic or metallic halide source under conditions such that the reaction temperature does not exceed a temperature in the range of from 20 to 40, for example, it does not exceed about 40° C.; or in the alternative, it does not exceed about 35° C.;
(B) at least one transition metal compound represented by the formula $Tm(OR)y Xy-x$ wherein Tm is a metal of Groups IVB, VB, VIB, VIM or VIII of the Periodic Table; R is a hydrocarbyl group having from 1 to about 20, for example from 1 to about 10 carbon atoms; X is a halide, and, $y$ and $x$ are integers and their sum is equal to 4, and
(C) an additional halide source to provide the desired excess X:Mg ratio; wherein additional halide source may be an organo halide compound of Group IIIA metal including, for example, those represented by the formula $R'_y MX_z$; wherein M is a metal from Group IIIA of the Periodic Table of Elements, for example aluminum or boron; each R' is independently an alkyl group having from 1 to 20, for example from 1 to 10, or in the alternative, from 2 to 8, carbon atoms; X is a halogen atom, for example chlorine; $y$ and $z$ each independently have a value from 1 to a value equal to the valence of M. Particularly suitable organo halide compounds include, for example, ethylaluminum dichloride, ethylaluminum sequichloride; diethylaluminum chloride; isobutylaluminum dichloride; diisobutylaluminum chloride; octylaluminum dichloride; and combinations of 2 or more thereof.

Particularly suitable transition metal compounds include, for example, titanium tetrachloride, titanium trichloride, tetra (isopropoxy)-titanium, tetrabutoxytitanium, diethoxytitanium dibromide, dibutoxytitanium dichloride, tetraphenoxytitanium, tri-isopropoxy vanadium oxide, zirconium tetra-n-propoxide, mixtures thereof and the like.

Other suitable titanium compounds which can be employed as the transition metal component herein include at least one titanium compound represented by the formula $Ti(OR)x X4-x$ wherein each R is independently a hydrocarbyl group having from 1 to about 20, for example from about 1 to about 10, or in the alternative, from about 2 to about 4 carbon atoms; X is a halogen and x has a value from zero to 4.

The foregoing procatalyst components are combined in proportions sufficient to provide atomic ratios as previously mentioned.

The foregoing pro-catalytic reaction product is prepared in the presence of an inert diluent. The concentrations of catalyst components are such that when the essential components of the catalytic reaction product are combined, the resultant slurry is from about 0.005 to about 1.0 molar (moles/liter) with respect to magnesium. Exemplary suitable inert organic diluents include, but are not limited to, liquefied ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, and naphthas. Exemplary suitable inert organic diluents are free of any olefin compounds and other impurities. Exemplary suitable inert organic diluents have boiling points in the range of from −50° C. to 200° C. Mixing of the procatalyst components to provide the desired catalytic reaction product is advantageously prepared under an inert atmosphere such as nitrogen, argon or other inert gas at temperatures in the range of from 10° C. to 50° C.; for example, from 20° C. to 40° C., provided that the magnesium halide support is prepared such that the reaction temperature does not exceed 35° C. In the preparation of the catalytic reaction product, it is not necessary to separate hydrocarbon soluble components from hydrocarbon insoluble components of the reaction product.

The procatalyst composition serves as one component of a Ziegler-Matta catalyst composition, in combination with a cocatalyst. The cocatalyst is employed in a molar ratio based on titanium in the procatalyst of from 1:1 to 100:1; for example, in a molar ratio in the range of from 0.5:1 to 3:1.

The inventive ethylene/alpha-olefin interpolymer may be blended with one or more polymers to form a blend. The inventive ethylene/alpha-olefin interpolymer may be blended with one or more additives. Such additives include, but are not limited to, antistatic agents, color enhancers, dyes, lubricants, fillers, pigments, primary antioxidants, secondary antioxidants, processing aids, UV stabilizers, and combinations thereof. The blend of the inventive ethylene/alpha-olefin interpolymer with one or more additives may contain any amounts of additives. The blend of the inventive ethylene/alpha-olefin interpolymer and one or more additives may compromise from about 0 to about 10 percent by the combined weight of such additives, based on the weight of the inventive ethylene/alpha-olefin interpolymer and the one or more additives.

Fiber Application

The fibers according to the instant invention comprise the inventive ethylene/alpha-olefin interpolymer, and optionally one or more other polymers. The inventive fibers may have a denier per filament in the range of less than 50 g/9000 m. All individual values and subranges from less than 50 g/9000 m are included herein and disclosed herein; for example, the denier per filament can be from a lower limit of 0.1, 0.5, 1, 5, 10, 15, 17, 20, 25, 30, 33, 40, or 44 g/9000 m to an upper limit of 0.5, 1, 5, 10, 15, 17, 20, 25, 30, 33, 40, 44, or 50 g/9000 m. For example, the inventive fibers may have a denier per filament in the range of less than 40 g/9000 m; or in the alternative, the inventive fibers may have a denier per filament in the range of less than 30 g/9000 m; or in the alternative, the inventive fibers may have a denier per filament in the range of less than 20 g/9000 m; or in the alternative, the inventive fibers may have a denier per filament in the range of less than 10 g/9000 m; or in the alternative, the inventive fibers may have a denier per filament in the range of less than 5 g/9000 m; or in the alternative, the inventive fibers may have a denier per filament in the range of less than 3 g/9000 m; or in the alternative, the inventive fibers may have a denier per filament in the range of less than 2 g/9000 m; or in the alternative, the inventive fibers may have a denier per filament in the range of less than 1.5 g/9000 m.

Inventive fibers according to the instant invention may be produced via different techniques. The inventive fibers may, for example, be produced via melt spinning. The inventive fibers according to instant invention may be continuous filaments, or in the alternative, the inventive fibers may be staple fibers. Continuous filaments may further be optionally crimped, and then cut to produce staple fibers. The inventive fibers include, but are not limited to, mono-component fibers, bi-component fibers, and/or multi-component fibers. Exemplary bi-component fibers include, but are not limited to, sheath/core, islands in the sea, segmented pie, and combination thereof. The inventive fibers may include the inventive ethylene/alpha-olefin interpolymer as an outer layer, e.g. sheath, alone or in combination with one or more polymers. The inventive fibers may include the inventive ethylene/alpha-olefin interpolymer as an inner layer, e.g. core, alone or in combination with one or more polymers. The inventive fibers or the inventive fiber components, i.e. inner layer and outer layer, according to the instant invention may be mono-constituent, i.e. only inventive ethylene/alpha-olefin interpolymer; or in the alternative, the inventive fibers or the inventive fiber components, i.e. inner layer and outer layer according to the instant invention may be multi-constituent, i.e. a blend of inventive ethylene/alpha-olefin interpolymer and one or more polymers. The term outer layer, as used herein, refers to at least any portion of the fiber surface. The term inner layer, as used herein, refers to any portion below the fiber surface.

In melt spinning, the inventive ethylene/alpha-olefin interpolymer is melt extruded and forced through the fine orifices in a metallic plate called spinneret into air or other gas, where it is cooled and solidified. The solidified filaments may be drawn-off via rotating rolls, or godets, and wound onto bobbins.

Inventive fabrics according to instant invention include, but are not limited to, non-woven fabrics, woven fabrics, and combination thereof.

The non-woven fabrics according to the instant invention may be fabricated via different techniques. Such methods include, but are not limited to, melt blown process, spunbond process, carded web process, air laid process, thermo-calendering process, adhesive bonding process, hot air bonding process, needle punch process, hydroentangling process, electrospinning process, and combinations thereof.

In melt blown process, the inventive non-woven fabric is formed by extruding molten inventive ethylene/alpha-olefin interpolymer through a die, then, attenuating and/or optionally breaking the resulting filaments with hot, high-velocity air or stream thereby forming short or long fiber lengths collected on a moving screen where they bond during cooling.

In the alternative, the melt blown process generally includes the following steps: (a) Extruding strands from a spinneret; (b) Simultaneously quenching and attenuating the polymer stream immediately below the spinneret using streams of high velocity heated air; (c) Collecting the drawn strands into a web on a foraminous surface. Meltblown webs can be bonded by a variety of means including, but not limited to, autogeneous bonding, i.e. self bonding without further treatment, thereto-calendering process, adhesive bonding process, hot air bonding process, needle punch process, hydroentangling process, and combinations thereof.

In spunbond process, the fabrication of non-woven fabric includes the following steps: (a) extruding strands of the inventive ethylene/alpha-olefin interpolymer from a spinneret; (b) quenching the strands of the inventive ethylene/alpha-olefin interpolymer with a flow of air which is generally cooled in order to hasten the solidification of the molten strands of the inventive ethylene/alpha-olefin interpolymer; (c) attenuating the filaments by advancing them through the quench zone with a draw tension that can be applied by either pneumatically entraining the filaments in an air stream or by wrapping them around mechanical draw rolls of the type commonly used in the textile fibers industry; (d) collecting the drawn strands into a web on a foraminous surface, e.g. moving screen or porous belt; and (e) bonding the web of loose strands into the non-woven fabric. Bonding can be achieved by a variety of means including, but not limited to, thermo-calendering process, adhesive bonding process, hot air bonding process, needle punch process, hydroentangling process, and combinations thereof.

The inventive woven fabrics according to the instant invention may be fabricated from the inventive fibers via different techniques. Such methods include, but are not limited to, weaving process, and knitting process.

In the weaving process, two sets of yarns, i.e. warp and weft, are interlaced to form the inventive woven fabric. The manner in which the two sets of yarns are interlaced determines the weave. The weaving process may be achieved via different equipments including, but not limited to, Dobby loom, Jacquard loom, and Power loom. By using various combinations of the three basic weaves, i.e. plain, twill, and satin, it is possible to produce an almost unlimited variety of constructions.

In the knitting process, the inventive woven fabric is formed by interlocking a series of loops of one or more yarns. The two major classes of knitting include, but are not limited to, wrap knitting and weft knitting.

Warp Knitting is a type of knitting in which the yarns generally run lengthwise in the fabric. The yarns are prepared as warps on beams with one or more yarns for each needle. Weft Knitting is, however, a common type of knitting, in which one continuous thread runs crosswise in the fabric making all of the loops in one course. Weft knitting types are circular and flat knitting.

The inventive fabrics according to the instant invention possess improved properties.

The inventive ethylene/alpha-olefin interpolymer may be used in a variety of end-use applications including, but not limited to, carpet, apparel, upholstery, non-woven fabrics, woven fabrics, artificial turf, medical gowns, hospital wraps, and the like.

EXAMPLES

The following examples illustrate the present invention but are not intended to limit the scope of the invention.

Production of Inventive Examples 1 and 2 and Comparative Example 1

All raw materials (ethylene, 1-octene) and the process solvent (an isoparaffinic solvent under the tradename ISOPAR E, which is commercially available from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via a mechanical compressor to a pressure that is above the reaction pressure, e.g. 750 psig. The solvent and comonomer (1-octene) feed is pressurized via a mechanical positive displacement pump to pressure that is above the reaction pressure, e.g. 750 psig. The individual catalyst components are manually batch diluted to specified component concentrations with purified solvent (ISOPAR E) and pressured to a pressure that is above the reaction pressure, e.g. 750 psig. All reaction feed flows are measured with mass flow meters and independently controlled with computer automated valve control systems.

The continuous solution polymerization reactor consists of a liquid full, non-adiabatic, isothermal, circulating, loop. Independent control of all fresh solvent, monomer, comonomer, hydrogen, and catalyst component feeds is possible. The combined solvent, monomer, comonomer and hydrogen feed is temperature controlled to anywhere between 5° C. to 50° C. and typically 40° C. by passing the feed stream through a heat exchanger. The fresh comonomer feed to the polymerization reactor is aligned to add comonomer to the recycle solvent. The total fresh feed to the polymerization reactor is injected into the reactor at two locations roughly with equal reactor volumes between each injection location. The fresh feed is controlled typically with each injector receiving half of the total fresh feed mass flow. The catalyst components are injected into the polymerization reactor through a specially designed injection inlet device and are combined into one mixed procatalyst/cocatalyst feed stream prior to injection into the reactor. The cocatalyst component is fed based on calculated specified molar ratios to the procatalyst component. Immediately following each fresh injection location (either feed or catalyst), the feed streams are mixed with the circulating polymerization reactor contents with Kenics static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop is provided by a screw pump. The effluent from the polymerization reactor (containing solvent, monomer, comonomer, hydrogen, catalyst components, and molten polymer) exits the reactor loop and enters a zone where it is contacted with a deactivating and acid scavenging agent (typically calcium stearate and the accompanying water of hydration) to stop the reaction and scavenge hydrogen chloride. In addition, various additives such as anti-oxidants can be added at this point. The stream then goes through another set of Kenics static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then passes through a pressure let down control valve (responsible for maintaining the pressure of the reactor at a specified target). The stream then enters a two stage separation and devolatilization system where the polymer is removed from the solvent, hydrogen, and unreacted monomer and comonomer. Impurities are removed from the recycled stream before entering the reactor again. The separated and devolatilized polymer melt is pumped through a die specially designed for underwater pelletization, cut into uniform solid pellets, dried, and transferred into a hopper. After validation of initial polymer properties, the solid polymer pellets are transferred to storage devices.

The portions removed in the devolatilization step may be recycled or destroyed. For example, most of the solvent is recycled back to the reactor after passing through purification beds. The recycled solvent can still have unreacted co-monomer in it that is fortified with fresh co-monomer prior to re-entry to the reactor. The recycled solvent can still have some hydrogen which is then fortified with fresh hydrogen.

Tables 1-3 summarize conditions for polymerization of Comparative Example 1 and Inventive Examples 1 and 2. Additives used in Comparative Example 1 and Inventive Examples 1 and 2 were 1250 ppm calcium stearate, 1000 ppm Irgafos 168, 250 ppm Irganox 1076, and 200 ppm Irganox 1010.

TABLE 1

Process reactor feeds used to make Comparative Example 1 and Inventive Examples 1 and 2

| REACTOR FEEDS | Comparative Example 1 | Inventive Example 1 | Inventive Example 2 |
|---|---|---|---|
| Primary Reactor Feed Temperature (° C.) | 40.1 | 40.1 | 39.9 |
| Primary Reactor Total Solvent Flow (lb/hr) | 1,408 | 1,408 | 1,422 |
| Primary Reactor Fresh Ethylene Flow (lb/hr) | 295.6 | 295.7 | 298.5 |
| Primary Reactor Total Ethylene Flow (lb/hr) | 307.7 | 308.5 | 311.2 |
| Comonomer Type | 1-octene | 1-octene | 1-octene |
| Primary Reactor Fresh Comonomer Flow (lb/hr) | 18.9 | 17.1 | 14.1 |
| Primary Reactor Total Comonomer Flow (lb/hr) | 113.7 | 102.2 | 86.3 |
| Primary Reactor Feed Solvent/Ethylene Ratio | 4.76 | 4.76 | 4.76 |
| Primary Reactor Fresh Hydrogen Flow (sccm) | 1,938 | 2,615 | 2,801 |
| Primary Reactor Hydrogen mole % | 0.101 | 0.136 | 0.144 |

TABLE 2

Process reactor conditions used to make Comparative Example 1 and Inventive Examples 1 and 2

| REACTION CONDITIONS | Comparative Example 1 | Inventive Example 1 | Inventive Example 2 |
|---|---|---|---|
| Primary Reactor Control Temperature (° C.) | 175 | 175 | 175 |
| Primary Reactor Pressure (Psig) | 725 | 725 | 725 |
| Primary Reactor FTnIR Outlet [C2] (g/L) | 8.9 | 8.9 | 8.9 |
| Primary Reactor $\log_{10}$ Viscosity (log(cP)) | 3.15 | 3.15 | 3.14 |
| Primary Reactor Polymer Concentration (wt %) | 17.7 | 17.6 | 17.5 |
| Primary Reactor Exchanger's Heat Transfer Coefficient (BTU/(hr ft$^2$ ° F.)) | 12 | 11 | 11 |
| Primary Reactor Polymer Residence Time (hr) | 0.12 | 0.12 | 0.12 |
| Overall Ethylene conversion by vent (wt %) | 92.0 | 92.0 | 92.0 |
| Total production rate (lb/hr) | 302 | 301 | 301 |

TABLE 3

Catalyst conditions used to make Comparative Example 1 and Inventive Examples 1 and 2 in which TEA is tri-ethyl-aluminum.

| CATALYST | Comparative Example 1 | Inventive Example 1 | Inventive Example 2 |
|---|---|---|---|
| Primary Reactor Catalyst Type | Ziegler-Natta | Ziegler-Natta | Ziegler-Natta |
| Primary Reactor Catalyst Flow (lb/hr) | 1.26 | 0.89 | 0.91 |
| Primary Reactor Catalyst Concentration (ppm) | 455 | 455 | 455 |
| Primary Reactor Catalyst Efficiency (M lbs Poly/lb Zr) | 0.526 | 0.745 | 0.726 |
| Primary Reactor Catalyst Metal Molecular Weight (g/mol) | 47.9 | 47.9 | 47.9 |
| Primary Reactor Co-Catalyst-1 Molar Ratio | 4.0 | 1.5 | 1.5 |
| Primary Reactor Co-Catalyst-1 Type | TEA | TEA | TEA |
| Primary Reactor Co-Catalyst-1 Flow (lb/hr) | 1.37 | 0.36 | 0.37 |
| Primary Reactor Co-Catalyst-1 Concentration (ppm) | 4,000 | 4,000 | 4,000 |

Characterization of Comparative Example 1 and Inventive Examples 1 and 2

Characterization properties of Comparative Example 1 and Inventive Examples 1 and 2 are reported in Table 4-14, and FIGS. 1-7.

TABLE 4

Melt index ($I_2$) and melt index ratio ($I_{10}/I_2$) and density of Comparative Example 1 and Inventive Examples 1 and 2

| Sample | Melt Index $I_2$ at 190° C. (g/10 min) | $I_{10}/I_2$ | Density (g/cm$^3$) |
|---|---|---|---|
| Comparative Example 1 | 0.54 | 9.32 | 0.9263 |
| Inventive Example 1 | 0.53 | 7.12 | 0.9272 |
| Inventive Example 2 | 0.56 | 6.91 | 0.9298 |

TABLE 5

DSC data of melt temperature ($T_m$), heat of fusion, percent crystallinity (% Cryst.), and crystallization temperature ($T_c$) of Comparative Example 1 and Inventive Examples 1 and 2

| | $T_m$ (° C.) | Heat of Fusion (J/g) | % Cryst. | $T_c$ (° C.) |
|---|---|---|---|---|
| Comparative Example 1 | 123.0 | 159.0 | 54.4 | 109.3 |
| Inventive Example 1 | 122.1 | 158.0 | 54.1 | 109.5 |
| Inventive Example 2 | 122.9 | 162.0 | 55.5 | 110.5 |

TABLE 6

DMS viscosity data of Comparative Example 1 and Inventive Examples 1 and 2

| | Viscosity (Pa-s) | | |
|---|---|---|---|
| Frequency (rad/s) | Comparative Example 1 | Inventive Example 1 | Inventive Example 2 |
| 0.10 | 14,704 | 12,689 | 12,096 |
| 0.16 | 14,288 | 12,407 | 11,815 |
| 0.25 | 13,762 | 12,003 | 11,453 |
| 0.40 | 13,110 | 11,512 | 10,993 |
| 0.63 | 12,353 | 10,920 | 10,448 |
| 1.00 | 11,535 | 10,248 | 9,823 |
| 1.58 | 10,583 | 9,502 | 9,125 |
| 2.51 | 9,595 | 8,685 | 8,360 |
| 3.98 | 8,620 | 7,820 | 7,548 |
| 6.31 | 7,576 | 6,927 | 6,705 |
| 10.00 | 6,545 | 6,031 | 5,852 |
| 15.85 | 5,533 | 5,149 | 5,009 |
| 25.12 | 4,611 | 4,315 | 4,209 |
| 39.81 | 3,771 | 3,566 | 3,467 |
| 63.10 | 3,020 | 2,860 | 2,800 |
| 100.00 | 2,377 | 2,260 | 2,217 |
| [Viscosity (0.1 rad/s)]/[Viscosity (100 rad/s)] | 6.19 | 5.61 | 5.46 |

TABLE 7

DMS tan delta data of Comparative Example 1 and Inventive Examples 1 and 2

| Frequency (rad/s) | Tan Delta | | |
|---|---|---|---|
| | Comparative Example 1 | Inventive Example 1 | Inventive Example 2 |
| 0.10 | 8.89 | 9.96 | 10.18 |
| 0.16 | 7.20 | 8.10 | 8.29 |
| 0.25 | 5.92 | 6.65 | 6.82 |
| 0.40 | 4.92 | 5.50 | 5.65 |
| 0.63 | 4.13 | 4.58 | 4.71 |
| 1.00 | 3.50 | 3.85 | 3.96 |
| 1.58 | 2.99 | 3.26 | 3.35 |
| 2.51 | 2.57 | 2.78 | 2.85 |
| 3.98 | 2.23 | 2.39 | 2.44 |
| 6.31 | 1.94 | 2.06 | 2.10 |
| 10.00 | 1.70 | 1.79 | 1.82 |
| 15.85 | 1.49 | 1.56 | 1.59 |
| 25.12 | 1.32 | 1.36 | 1.39 |
| 39.81 | 1.17 | 1.19 | 1.22 |
| 63.10 | 1.04 | 1.05 | 1.07 |
| 100.00 | 0.92 | 0.93 | 0.94 |

TABLE 8

Complex modulus and phase angle data of Comparative Example 1 and Inventive Examples 1 and 2

| Comparative Example 1 | | Inventive Example 1 | | Inventive Example 2 | |
|---|---|---|---|---|---|
| G* (Pa) | Phase Angle | G* (Pa) | Phase Angle | G* (Pa) | Phase Angle |
| 1.47E+03 | 83.59 | 1.27E+03 | 84.27 | 1.21E+03 | 84.39 |
| 2.26E+03 | 82.09 | 1.97E+03 | 82.96 | 1.87E+03 | 83.12 |
| 3.46E+03 | 80.41 | 3.02E+03 | 81.44 | 2.88E+03 | 81.65 |
| 5.22E+03 | 78.51 | 4.58E+03 | 79.69 | 4.38E+03 | 79.96 |
| 7.79E+03 | 76.40 | 6.89E+03 | 77.69 | 6.59E+03 | 78.02 |
| 1.15E+04 | 74.07 | 1.02E+04 | 75.45 | 9.82E+03 | 75.83 |
| 1.68E+04 | 71.51 | 1.51E+04 | 72.93 | 1.45E+04 | 73.37 |
| 2.41E+04 | 68.77 | 2.18E+04 | 70.21 | 2.10E+04 | 70.66 |
| 3.43E+04 | 65.81 | 3.11E+04 | 67.25 | 3.00E+04 | 67.73 |
| 4.78E+04 | 62.73 | 4.37E+04 | 64.08 | 4.23E+04 | 64.57 |
| 6.55E+04 | 59.51 | 6.03E+04 | 60.75 | 5.85E+04 | 61.25 |
| 8.77E+04 | 56.18 | 8.16E+04 | 57.27 | 7.94E+04 | 57.77 |
| 1.16E+05 | 52.82 | 1.08E+05 | 53.71 | 1.06E+05 | 54.20 |
| 1.50E+05 | 49.45 | 1.42E+05 | 49.89 | 1.38E+05 | 50.57 |
| 1.91E+05 | 46.08 | 1.80E+05 | 46.51 | 1.77E+05 | 46.93 |
| 2.38E+05 | 42.70 | 2.26E+05 | 42.90 | 2.22E+05 | 43.28 |

TABLE 9

Melt strength data of Comparative Example 1 and Inventive Examples 1 and 2

| | Melt Strength (cN) at 190° C. |
|---|---|
| Comparative Example 1 | 5.1 |
| Inventive Example 1 | 4.4 |
| Inventive Example 2 | 4.3 |

TABLE 10

GPC data by conventional GPC of Comparative Example 1 and Inventive Examples 1 and 2

| | $M_w$ (g/mol) | $M_n$ (g/mol) | $M_w/M_n$ | $M_z$ (g/mol) |
|---|---|---|---|---|
| Comparative Example 1 | 143,800 | 36,090 | 3.98 | 438,300 |
| Inventive Example 1 | 135,600 | 38,600 | 3.51 | 357,200 |
| Inventive Example 2 | 133,800 | 38,950 | 3.44 | 349,900 |

Figure 6:
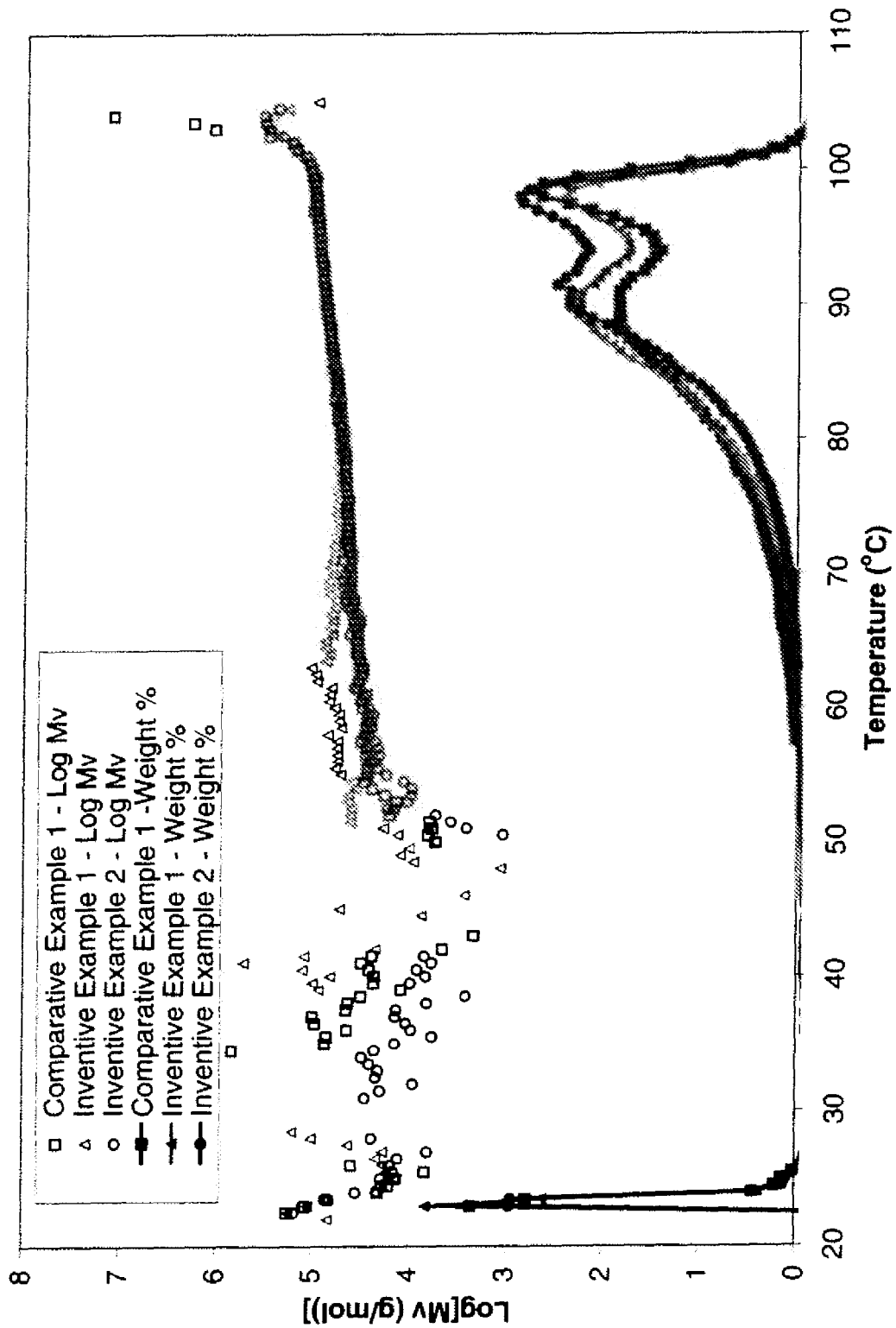
FIG. 6 is a graph illustrating the short chain branching distribution and log $M_v$ data from ATREF for Comparative Example 1 and Inventive Examples 1 and 2.

ATREF data are summarized in Table 11 and FIG. 6 for Comparative Example 1 and Inventive Example 1 and 2. The calculated molecular weights are derived from the weight fraction, $w_T$, and intrinsic viscosity, $[\eta]_T$, measured at each elution temperature, T, in the ATREF analysis. The viscosity average molecular weight, $M_{V,T}$, is first calculated from each intrinsic viscosity as follows:

$$M_{v,T} = ([\eta]_T/K)^{1/a}$$

Where $K = 4 \times 10^{-4}$ and $a = 0.73$.

The average molecular weights are then calculated as follows:

$$M_{hc} = \sum_{T=T_{hr}}^{110} w_T \cdot M_{V.T} \Big/ \sum_{T=T_{hc}}^{110} w_T$$

$$M_{c-1} = \sum_{T=60}^{90} w_T \cdot M_{V.T} \Big/ \sum_{T=60}^{90} w_T$$

$$M_{c-2} = \sum_{T=75}^{90} w_T \cdot M_{V.T} \Big/ \sum_{T=75}^{90} w_T$$

$$M_P = \sum_{T=20}^{110} w_T \cdot M_{V.T} \Big/ \sum_{T=20}^{110} w_T$$

The different temperature ranges applied to each average are $T_{hc}$ to 110° C. for $M_{hc}$, 60° to 90° C. for $M_{c-1}$, and 75° to 90° C. for $M_{c-2}$ and 20° to 110° C. for $M_p$.

TABLE 11

Resin product and characterization data including ATREF data for Comparative Example 1 and Inventive Examples 1 and 2

| Description | Comparative Example 1 | Inventive Example 1 | Inventive Example 2 |
|---|---|---|---|
| Resin MI ($I_2$) (g/10 minutes) | 0.54 | 0.53 | 0.56 |
| Resin density (g/cc) | 0.9263 | 0.9272 | 0.9298 |
| Catalyst | Ziegler-Natta | Ziegler-Natta | Ziegler-Natta |
| Ti/40 Mg | 3 | 3 | 3 |
| Al/Ti | 4 | 1.5 | 1.5 |
| Reactor Temperature (° C.) | 175 | 175 | 175 |
| $M_{hc}$ | 131,800 | 127,600 | 123,700 |
| $M_{c-1}$ | 74,230 | 86,500 | 75,530 |
| $M_{c-2}$ | 79,710 | 87,100 | 78,580 |
| $M_p$ | 99,770 | 106,310 | 101,100 |
| $M_{hc}/M_p$ | 1.32 | 1.20 | 1.22 |
| $M_{c-2}/M_p$ | 0.80 | 0.82 | 0.78 |

TABLE 11-continued

Resin product and characterization data including ATREF data for Comparative Example 1 and Inventive Examples 1 and 2

| Description | Comparative Example 1 | Inventive Example 1 | Inventive Example 2 |
|---|---|---|---|
| % HD Fraction - ATREF | 30.2 | 28.9 | 33.8 |

Figure 7:
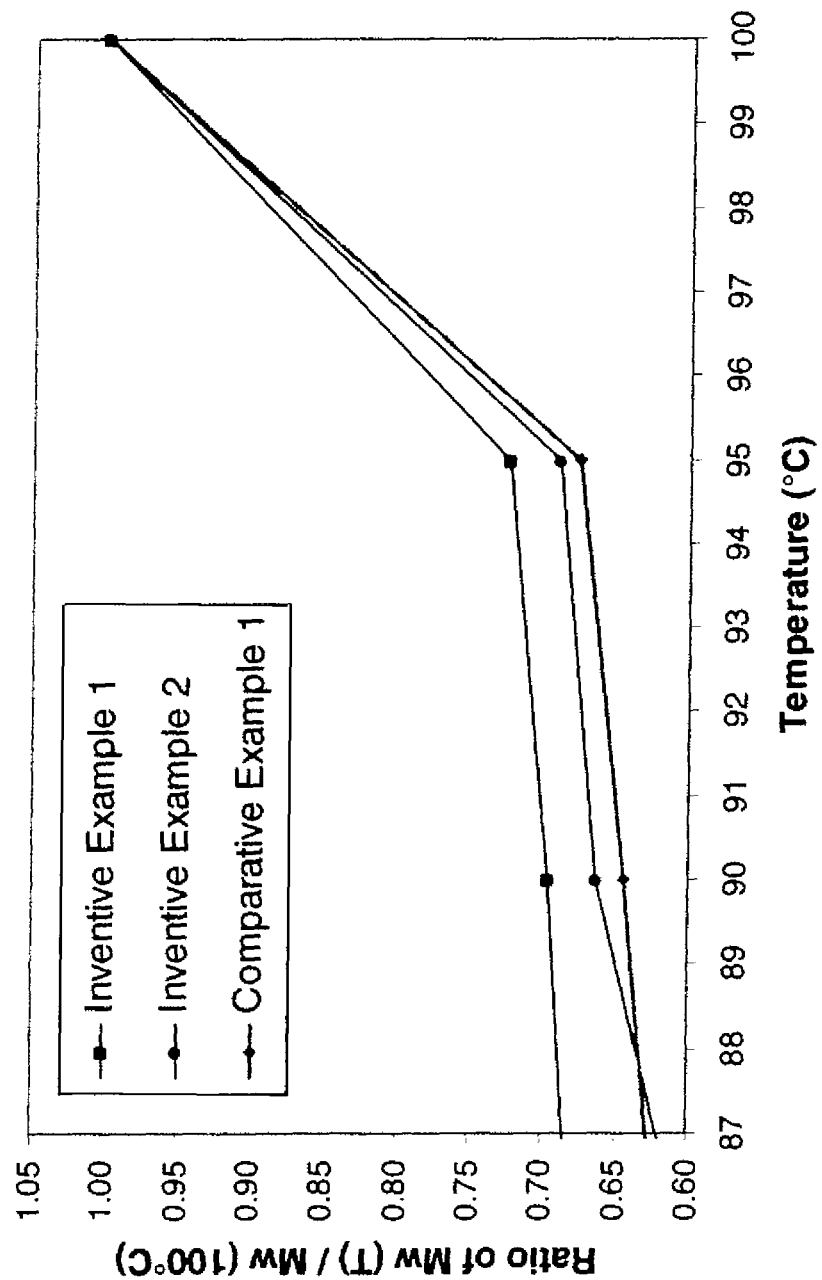
FIG. 7 is a graph illustrating the Crossfractionation data plotted as the ratio of $M_w(T)/M_w$ (100° C.) vs. Temperature for Comparative Example 1 and Inventive Examples 1 and 2.

$M_v$, viscosity average molecular weight from ATREF
$M_{hc}$, Average $M_v$ for fraction above $T_{hc}$ from ATREF
$M_{c-1}$, Average $M_v$ of copolymer between 60-90° C. - ATREF
$M_{c-2}$, Average $M_v$ of copolymer between 75-90° C. - ATREF
$M_p$, Average $M_v$ of whole polymer from ATREF
% HD fraction, area under the curve above $T_{hc}$ The crossfractionation results are summarized in Tables 12-14 for Comparative Example 1 and Inventive Examples 1 and 2. Crossfractionation shows that the weight average molecular weights for the 90° C. and 95° C. fractions of Examples 1 and 2 are higher relative to the 100° C. fraction than that of Comparative Example 1 as shown in FIG. 7.

TABLE 12

Forward cross-fractionation results for Comparative Example 1.

| | | | GPC | | | | GPC-LS | | | |
|---|---|---|---|---|---|---|---|---|---|---|
| Fraction | Temp. (° C.) | Percent | $M_n$ (g/mol) | $M_w$ (g/mol) | $M_z$ (g/mol) | $M_w/M_n$ | $M_z$ (g/mol) | $M_{z+1}$ (g/mol) | $M_z/M_w$ | Abs $M_w$ (g/mol) |
| 1 | 30.0 | 0.7% | ND | ND | ND | ND | ND | ND | ND | ND |
| 2 | 35.0 | 0.2% | ND | ND | ND | ND | ND | ND | ND | ND |
| 3 | 40.0 | 0.2% | ND | ND | ND | ND | ND | ND | ND | ND |
| 4 | 45.0 | 0.4% | ND | ND | ND | ND | ND | ND | ND | ND |
| 5 | 50.0 | 0.5% | ND | ND | ND | ND | ND | ND | ND | ND |
| 6 | 55.0 | 0.9% | ND | ND | ND | ND | ND | ND | ND | ND |
| 7 | 60.0 | 1.5% | ND | 73,038 | ND | ND | ND | ND | ND | ND |
| 8 | 65.0 | 2.2% | 21,126 | 78,530 | 233,998 | 3.72 | ND | ND | ND | ND |
| 9 | 70.0 | 3.7% | 27,515 | 101,975 | 329,411 | 3.71 | 359,090 | 828,070 | 3.52 | 89,681 |
| 10 | 75.0 | 6.0% | 34,603 | 113,242 | 346,046 | 3.27 | 321,724 | 687,653 | 2.84 | 102,713 |
| 11 | 80.0 | 10.5% | 44,102 | 129,876 | 354,231 | 2.94 | 315,090 | 627,933 | 2.43 | 114,643 |
| 12 | 85.0 | 13.8% | 56,002 | 153,733 | 395,567 | 2.75 | 380,374 | 843,544 | 2.47 | 135,509 |
| 13 | 90.0 | 11.2% | 62,056 | 160,346 | 403,728 | 2.58 | 399,812 | 908,159 | 2.49 | 141,977 |
| 14 | 95.0 | 30.9% | 74,040 | 168,451 | 379,318 | 2.28 | 378,051 | 851,155 | 2.24 | 152,071 |
| 15 | 100.0 | 16.7% | 109,809 | 249,221 | 621,081 | 2.27 | 568,030 | 1,158,681 | 2.28 | 228,252 |
| 16 | 105.0 | 0.7% | ND | ND | ND | ND | ND | ND | ND | ND |

ND = none detected (too little material collected for further analysis).

TABLE 13

Forward cross-fractionation results for Inventive Example 1.

| | | | GPC | | | | GPC-LS | | | |
|---|---|---|---|---|---|---|---|---|---|---|
| Fraction | Temp. (° C.) | Percent | $M_n$ (g/mol) | $M_w$ (g/mol) | $M_z$ (g/mol) | $M_w/M_n$ | $M_z$ (g/mol) | $M_{z+1}$ (g/mol) | $M_z/M_w$ | Abs $M_w$ (g/mol) |
| 1 | 30.0 | 0.5% | ND | ND | ND | ND | ND | ND | ND | ND |
| 2 | 35.0 | 0.1% | ND | ND | ND | ND | ND | ND | ND | ND |
| 3 | 40.0 | 0.3% | ND | ND | ND | ND | ND | ND | ND | ND |
| 4 | 45.0 | 0.3% | ND | ND | ND | ND | ND | ND | ND | ND |
| 5 | 50.0 | 0.4% | ND | ND | ND | ND | ND | ND | ND | ND |
| 6 | 55.0 | 0.7% | ND | ND | ND | ND | ND | ND | ND | ND |
| 7 | 60.0 | 1.1% | ND | 61,480 | ND | ND | ND | ND | ND | ND |
| 8 | 65.0 | 1.8% | ND | 78,548 | ND | ND | ND | ND | ND | ND |
| 9 | 70.0 | 2.9% | 24,941 | 86,405 | 257,398 | 3.46 | 245,223 | ND | 2.84 | 86,351 |
| 10 | 75.0 | 5.1% | 30,030 | 99,903 | 284,719 | 3.33 | 321,104 | 907,886 | 3.21 | 101,122 |
| 11 | 80.0 | 9.1% | 41,538 | 122,096 | 313,606 | 2.94 | 310,237 | 685,612 | 2.54 | 118,309 |
| 12 | 85.0 | 15.4% | 55,956 | 146,314 | 339,927 | 2.61 | 344,450 | 748,060 | 2.35 | 131,867 |
| 13 | 90.0 | 16.2% | 62,114 | 150,443 | 340,362 | 2.42 | 360,793 | 804,298 | 2.40 | 156,557 |
| 14 | 95.0 | 27.9% | 68,710 | 156,289 | 358,899 | 2.27 | 355,351 | 803,247 | 2.27 | 162,738 |
| 15 | 100.0 | 16.6% | 96,322 | 215,975 | 501,356 | 2.24 | 525,454 | 1,179,049 | 2.43 | 196,562 |
| 16 | 105.0 | 1.6% | ND | 294,077 | ND | ND | 685,876 | 1,435,396 | 2.33 | 259,457 |

ND = none detected (too little material collected for further analysis).

TABLE 14

Forward cross-fractionation results for Inventive Example 2.

| | | | GPC | | | | GPC-LS | | | |
|---|---|---|---|---|---|---|---|---|---|---|
| Fraction | Temp. (° C.) | Percent | $M_n$ (g/mol) | $M_w$ (g/mol) | $M_z$ (g/mol) | $M_w/M_n$ | $M_z$ (g/mol) | $M_{z+1}$ (g/mol) | $M_z/M_w$ | Abs $M_w$ (g/mol) |
| 1 | 30.0 | 0.3% | ND | ND | ND | ND | ND | ND | ND | ND |
| 2 | 35.0 | 0.1% | ND | ND | ND | ND | ND | ND | ND | ND |
| 3 | 40.0 | 0.1% | ND | ND | ND | ND | ND | ND | ND | ND |
| 4 | 45.0 | 0.1% | ND | ND | ND | ND | ND | ND | ND | ND |
| 5 | 50.0 | 0.3% | ND | ND | ND | ND | ND | ND | ND | ND |
| 6 | 55.0 | 0.4% | ND | ND | ND | ND | ND | ND | ND | ND |
| 7 | 60.0 | 0.8% | ND | ND | ND | ND | ND | ND | ND | ND |
| 8 | 65.0 | 1.2% | ND | 77,600 | ND | ND | ND | ND | ND | ND |
| 9 | 70.0 | 2.2% | 22,180 | 79,911 | 234,554 | 3.60 | 234,298 | ND | 2.93 | 79,484 |
| 10 | 75.0 | 3.9% | 28,729 | 97,371 | 319,052 | 3.39 | 306,996 | 650,620 | 3.15 | 83,091 |
| 11 | 80.0 | 7.6% | 38,305 | 117,328 | 343,057 | 3.06 | 308,319 | 666,154 | 2.63 | 97,938 |
| 12 | 85.0 | 12.5% | 51,946 | 140,315 | 350,823 | 2.70 | 332,522 | 768,505 | 2.37 | 117,830 |
| 13 | 90.0 | 15.3% | 65,132 | 157,517 | 364,969 | 2.42 | 377,956 | 848,888 | 2.40 | 137,212 |
| 14 | 95.0 | 37.0% | 74,450 | 163,685 | 376,179 | 2.20 | 368,083 | 874,065 | 2.25 | 143,852 |
| 15 | 100.0 | 17.2% | 109,025 | 237,391 | 571,284 | 2.18 | 557,810 | 1,220,640 | 2.35 | 213,803 |
| 16 | 105.0 | 1.2% | ND | 455,943 | ND | ND | 924,591 | ND | 2.03 | 207,063 |

ND = none detected (too little material collected for further analysis).

Test Methods

Test methods include the following:

Density

Density (g/cm$^3$) is measured according to ASTM-D 792-03, Method B, in isopropanol. Specimens are measured within 1 hour of molding after conditioning in the isopropanol bath at 23° C. for 8 min to achieve thermal equilibrium prior to measurement. The specimens are compression molded according to ASTM D-4703-00 Annex A with a 5 min initial heating period at about 190° C. and a 15° C./min cooling rate per Procedure C. The specimen is cooled to 45° C. in the press with continued cooling until "cool to the touch."

Melt Index

Melt index, or $I_2$, is measured in accordance with ASTM D 1238, Condition 190° C./2.16 kg, and is reported in grams eluted per 10 minutes. $I_{10}$ is measured in accordance with ASTM D 1238, Condition 190° C./10 kg, and is reported in grams eluted per 10 minutes.

Comonomer Distribution Breadth Index (CDBI)

The CDBI is defined as the weight percent of the polymer molecules having a co-monomer content within 50 percent of the median total molar co-monomer content and represents a comparison of the co-monomer distribution in the polymer to the co-monomer distribution expected for a Bernoullian distribution. The CDBI of polyolefins can be conveniently calculated from data obtained from techniques known in the art, such as, for example, temperature rising elution fractionation ("TREF") as described, for example, by Wild, et al., *Journal of Polymer Science*, Poly. Phys. Ed., Vol. 20, 441 (1982); L. D. Cady, "The Role of Comonomer Type and Distribution in LLDPE Product Performance," *SPE Regional Technical Conference*, Quaker Square Hilton, Akron, Ohio, 107-119 (Oct. 1-2, 1985); or in U.S. Pat. No. 4,798,081 (Hazlitt, et al.) and U.S. Pat. No. 5,008,204 (Stehling). However, the TREF technique does not include purge quantities in CDBI calculations. More preferably, the co-monomer distribution of the polymer is determined using $^{13}$C NMR analysis in accordance with techniques described, for example, in U.S. Pat. No. 5,292,845 (Kawasaki, et al.) and by J. C. Randall in Rev. Macromol. Chem. Phys., C29, 201-317.

Presence of Long Chain Branching

The presence of long chain branching can be determined in ethylene homopolymers by using $^{13}$C nuclear magnetic resonance (NMR) spectroscopy and is quantified using the method described by Randall (*Rev. Macromol. Chem. Phys.*, C29, V. 2&3, 285-297). There are other known techniques useful for determining the presence of long chain branches in ethylene polymers, including ethylene/1-octene interpolymers. Two such exemplary methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, for example, Zimm, G. H. and Stockmayer, W. H., *J. Chem. Phys.*, 17, 1301 (1949), and Rudin, A., *Modern Methods of Polymer Characterization*, John Wiley & Sons, New York (1991) 103-112.

DSC Crystallinity

Differential Scanning calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for polyethylene samples using:

% Crystallinity=(($H_f$)/(292 J/g))×100

The heat of fusion ($H_f$) and the peak melting temperature are reported from the second heat curve. Peak crystallization temperature is determined from the cooling curve.

Gel Permeation Chromatography (GPC)

For gel permeation chromatography (GPC) measurements, the chromatographic system consisted of a Polymer Laboratories Model PL-220. The column and carousel compartments are operated at 140° C. Three Polymer Laboratories 10-μm Mixed-B columns can be used with a solvent of 1,2,4 trichlorobenzene. The samples are prepared at a concentration of 0.1 g of polymer in 50 ml of solvent. The solvent that can be used to prepare the samples should contain 200 ppm of the antioxidant butylated hydroxytoluene (BHT). Samples can be prepared by agitating lightly for 4 hours at 160° C. The injection volume that can be used is 100 microliters and the flow rate is 1.0 ml/min. Calibration of the GPC column set can be performed with narrow molecular weight distribution polystyrene standards purchased from Polymer Laboratories. The polystyrene standard peak molecular weights can be converted to polyethylene molecular weights using the method of Williams and Ward:

$$M_{polyethylene} = A(M_{polystyrene})^B$$

in which M is the molecular weight, A has a value of 0.4316 and B is equal to 1.0. Polyethylene equivalent molecular weight calculations were performed using Viscotek TriSEC software Version 3.0. Williams, T., and I. M. Ward, "The Construction of Polyethylene Calibration Curve for Gel Permeation Chromatography Using Polystyrene Fractions", J. Polym. Sci. Polym. Lett., 6, 621 (1968).

Analytical Temperature Rising Elution Fractionation (ATREF)

High Density Fraction (percent) is measured via analytical temperature rising elution fractionation analysis (ATREF). ATREF analysis is conducted according to the method described in U.S. Pat. No. 4,798,081 and Wilde, L.; Ryle, T. R.; Knobeloch, D. C.; Peat, I. R.; Determination of Branching Distributions in Polyethylene and Ethylene Copolymers, Journal of Polymer Science, 20, 441-455 (1982). The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min. Viscosity average molecular weight ($M_v$) of the eluting polymer is measured and reported. An ATREF plot has the short chain branching distribution (SCBD) plot and a molecular weight plot. The SCBD plot has 3 peaks, one for the high crystalline fraction (typically above 90° C.), one for copolymer fraction (typically in between 30-90° C.) and one for purge fraction (typically below 30° C.). The curve also has a valley in between the copolymer and the high crystalline fraction. $T_{hc}$ is the lowest temperature in this valley. % High density (HD) fraction is the area under the curve above $T_{hc}$. $M_v$ is the viscosity average molecular weight from ATREF. $M_{hc}$ is the average $M_v$ for fraction above $T_{hc}$. $M_c$ is the average $M_v$ of copolymer between 60-90° C. $M_p$ is the average $M_v$ of whole polymer.

C13 NMR Comonomer Content

It is well known to use NMR spectroscopic methods for determining polymer composition. ASTM D 5017-96, J. C. Randall et al., in "NMR and Macromolecules" ACS Symposium series 247, J. C. Randall, Ed., Am. Chem. Soc., Washington, D.C., 1984, Ch. 9, and J. C. Randall in "Polymer Sequence Determination", Academic Press, New York (1977) provide general methods of polymer analysis by NMR spectroscopy.

Dynamic Mechanical Spectroscopy (DMS)

Resins were compression-molded into 3 mm thick×1 inch circular plaques at 350° F. for 5 minutes under 1500 psi pressure in air. The sample is then taken out of the press and placed on the counter to cool.

A constant temperature frequency sweep is performed using a TA Instruments "Advanced Rheometric Expansion System (ARES)," equipped with 25 mm parallel plates, under a nitrogen purge. The sample is placed on the plate and allowed to melt for five minutes at 190° C. The plates are then closed to 2 mm, the sample trimmed, and then the test is started. The method has an additional five minute delay built in, to allow for temperature equilibrium. The experiments are performed at 190° C. over a frequency range of 0.1 to 100 rad/s. The strain amplitude is constant at 10%. The stress response is analyzed in terms of amplitude and phase, from which the storage modulus (G'), loss modulus (G"), complex modulus (G*), dynamic viscosity η*, and tan (δ) or tan delta are calculated.

Melt Strength

Melt strength is measured at 190° C. using a Göettfert Rheotens 71.97 (Göettfert Inc.; Rock Hill, S.C.), melt fed with a Göettfert Rheotester 2000 capillary rheometer equipped with a flat entrance angle (180 degrees) of length of 30 mm and diameter of 2 mm. The pellets are fed into the barrel (L=300 mm, Diameter=12 mm), compressed and allowed to melt for 10 minutes before being extruded at a constant piston speed of 0.265 minis, which corresponds to a wall shear rate of 38.2 s$^{-1}$ at the given die diameter. The extrudate passes through the wheels of the Rheotens located at 100 mm below the die exit and is pulled by the wheels downward at an acceleration rate of 2.4 mm/s$^2$. The force (in cN) exerted on the wheels is recorded as a function of the velocity of the wheels (in min/s). Melt strength is reported as the plateau force (cN) before the strand broke.

Cross Fractionation: Temperature Rising Elution Fractionation (TREF) followed by GPC The experiment is performed with an instrument constructed according to Gillespie and Li Pi Shan et al. (Apparatus for Method for Polymer Characterization, WO2006081116). The data acquisition rate is one data point/second.

TREF Column

The TREF columns are constructed from acetone-washed ⅛ inch×0.085 inch 316 stainless steel tubing. The tubing is cut to a length of 42 inches and packed with a dry mixture (60:40 volume: volume) of pacified 316 stainless steel cut wire of 0.028 inch diameter (Pellet Inc., North Tonawanda, N.Y.) and 30-40 mesh spherical technical grade glass beads. This combination of column length and packing material results in an interstitial volume of approximately 1.75 mL. The TREF column ends are capped with Valco microbore HPLC column end fittings equipped with a 10 μm stainless steel screen. These column ends provide the TREF columns with a direct connection to the plumbing of the cross fractionation instrument within the TREF oven. The TREF columns are coiled, outfitted with a resistance temperature detector (RTD) temperature sensor, and wrapped with glass insulation tape before installation. During installation, extra care is given to level placement of the TREF column with the oven to ensure adequate thermal uniformity within the column. Chilled air is provided at 40 L/min to the TREF ovens via a chiller whose bath temperature is 2° C.

TREF Column Temperature Calibration

The reported elution temperatures from the TREF column are adjusted with the heating rate used in the temperature range of 110° C. to 30° C. such that the observed compositions versus elution temperatures agree with those previously reported (L. Wild, R. T. Ryle et al., J. Polymer Science Polymer Physics Edition 20, 441-455(1982)).

Sample Preparation

The sample solutions are prepared as 4 mg/mL solutions in 1,2,4-trichlorobenzene (TCB) containing 180 ppm butylated hydroxytoluene (BHT) and the solvent is sparged with nitrogen. A small amount of decane is added as a flow rate marker to the sample solution for GPC elution validation. Dissolution of the samples is completed by gentle stirring at 145° C. for four hours.

Sample Loading

Samples are injected via a heated transfer line to a fixed loop injector (Injection loop of 500 μL) directly onto the TREF column at 145° C.

Temperature Profile of TREF Column

After the sample has been injected onto the TREF column, the column is taken "off-line" and allowed to cool. The temperature profile of the TREF column is as follows: cooling down from 145° C. to 110° C. at 2.19° C./min, cooling down from 110° C. to 30° C. at 0.110° C./min, and thermal equilibrium at 30° C. for 16 minutes. During elution, the column is placed back "on-line" to the flow path with a pump elution rate of 0.9 ml/min for 1.0 minute. The heating rate of elution is 0.119° C./min from 30° C. to 110° C.

Elution from TREF Column

The 16 fractions are collected from 30° C. to 110° C. at 5° C. increments per fraction. Each fraction is injected for GPC analysis. Each of the 16 fractions are injected directly from the TREF column over a period of 1.0 minute onto the GPC column set. The eluent is equilibrated at the same temperature as the TREF column during elution by using a temperature pre-equilibration coil (Gillespie and Li Pi Shan et al., Apparatus for Method for Polymer Characterization, WO2006081116). Elution of the TREF is performed by flushing the TREF column at 0.9 ml/min for 1.0 min. The first fraction, Fraction (30° C.), represents the amount of material remaining soluble in TCB at 30° C. Fraction (35° C.), Fraction (40° C.), Fraction (45° C.), Fraction (50° C.), Fraction (55° C.), Fraction (60° C.), Fraction (65° C.), Fraction (70° C.), Fraction (75° C.) Fraction (80° C.), Fraction (85° C.), Fraction (90° C.), Fraction (95° C.), Fraction (100° C.), and Fraction (105° C.) represent the amount of material eluting from the TREF column with a temperature range of 30.01 to 35° C., 35.01 to 40° C., 40.01 to 45° C., 45.01 to 50° C., 50.01 to 55° C., 55.01 to 60° C., 60.01 to 65° C., 65.01 to 70° C., 70.01 to 75° C., 75.01 to 80° C., 80.01 to 85° C., 85.01 to 90° C., 90.01 to 95° C., 95.01 to 100° C., and 100.01 to 105° C., respectively.

GPC Parameters

The cross fractionation instrument is equipped with one 20 μm guard column and four Mixed A-LS 20 μm columns (Varian Inc., previously PolymerLabs), and the IR-4 detector from PolymerChar (Spain) is the concentration detector. The GPC column set is calibrated by running twenty one narrow molecular weight distribution polystyrene standards. The molecular weight (MW) of the standards ranges from 580 to 8,400,000 g/mol, and the standards are contained in 6 "cocktail" mixtures. Each standard mixture ("cocktail") has at least a decade of separation between individual molecular weights. The standards are purchased from Polymer Laboratories (Shropshire, UK). The polystyrene standards are prepared at 0.005 g in 20 mL of solvent for molecular weights equal to or greater than 1,000,000 g/mol and 0.001 g in 20 mL of solvent for molecular weights less than 1,000,000 g/mol. The polystyrene standards are dissolved at 145° C. with gentle agitation for 30 minutes. The narrow standards mixtures are run first and in the order of decreasing highest molecular weight component to minimize degradation. A logarithmic molecular weight calibration is generated using a fourth-order polynomial fit as a function of elution volume. The polystyrene standard peak molecular weights are converted to polyethylene molecular weights using the following equation as described in Williams and Ward, J. Polym. Sci., Polym. Let., 6, 621 (1968):

$$M_{polyethylene} = A(M_{polystyrene})^B$$

where M is the molecular weight, A has a value of 0.40 and B is equal to 1.0.

The plate count for the four Mixed A-LS 20 μm columns needs to be at least 19,000 by using a 200 μl injection volume of a 0.4 mg/ml solution of Eicosane in 1,2,4-Trichlorobenzene (TCB) bypassing the TREF column. The plate count calculates from the peak retention volume ($RV_{pk\ max}$) and the retention volume (RV) width at ½ height (50% of the chromatographic peak) to obtain an effective measure of the number of theoretical plates in the column by using the following equation (Striegel and Yau et al., "Modern Size-Exclusion Liquid Chromatography", Wiley, 2009, Page 86):

$$\text{Plate Count} = 5.54 * [RV_{pk\ max} / (RV_{Rear\ 50\%\ pk\ ht} - RV_{Front\ 50\%\ pk\ ht})]^2$$

MWD Analysis for Each Fraction

The molecular weight distribution (MWD) of each fraction is calculated from the integrated GPC chromatogram to obtain the weight average molecular weight for each fraction, MW(Temperature).

The establishment of the upper integration limit (high molecular weight end) is based on the visible difference between the peak rise from the baseline. The establishment of the lower integration limit (low molecular weight end) is viewed as the return to the baseline or the point of the elution volume of the polystyrene narrow molecular weight standard of 3250 molecular weight (whichever is earlier).

The white noise level of the IR-4 detector is calculated from the IR-4 detector upon analyzing the GPC chromatogram before the upper integration limit (prior to polymer elution). The detector response at each acquisition time contributed from the polymer chains is first corrected for the baseline correction to obtain the baseline subtracted signal (IR(RV), RV is the elution volume of the GPC chromatogram). The baseline corrected IR-4 response is further corrected for white noise: IR(RV) is used in the GPC calculation only if IR(RV) is larger than the white noise value. In this work, a typical white noise for the IR is determined to be 0.35 mV while the whole-polymer (direct 0.50 mg GPC-injection on the GPC column bypassing the TREF column) peak height in mV is typically around 240 for a polyolefin polymer (high density polyethylene, polydispersity $M_w/M_n$ approximately 2.6). Care should be maintained to provide a signal to noise ratio (the peak height of whole polymer injection to the white noise) of at least 500 at 1.0 mg/ml 500 μL injection volume for a polyolefin polymer (high density polyethylene, polydispersity $M_w/M_n$ approximately 2.6).

The area of each individual GPC chromatogram corresponds to the amount of polyolefinic material eluted from the TREF fraction. The weight percentage of the TREF fraction at a specified temperature range of the Fraction, Wt % (Temperature), is calculated as the area of the individual GPC chromatogram divided by the sum of the areas of the 16 individual GPC chromatograms. The GPC molecular weight distribution calculations (Mn, Mw, and Mz) are performed on each chromatogram and reported only if the weight percentage of the TREF fraction is larger than 1.0 wt %. The GPC weight-average molecular weight, Mw, is reported as MW (Temperature) of each chromatogram.

Wt % (30° C.) represents the amount of material eluting from the TREF column at 30° C. during the TREF elution process, Wt % (35° C.), Wt % (40° C.), Wt % (45° C.), Wt % (50° C.), Wt % (55° C.), Wt % (60° C.), Wt % (65° C.), Wt % (70° C.), Wt % (75° C.), Wt % (80° C.), Wt % (85° C.), Wt % (90° C.), Wt % (95° C.), Wt % (100° C.), and Wt % (105° C.) represent the amount of material eluting from the TREF column with a temperature range of 30.01° C. to 35° C., 35.01° C. to 40° C., 40.01 to 45° C., 45.01° C. to 50° C., 50.01° C. to 55° C., 55.01° C. to 60° C., 60.01° C. to 65° C., 65.01° C. to 70° C., 70.01° C. to 75° C., 75.01° C. to 80° C., 80.01° C. to 85° C., 85.01° C. to 90° C., 90.01° C. to 95° C., 95.01° C. to 100° C., and 100.01° C. to 105° C., respectively. The cumulative weight fraction is defined as the sum of the Wt % of the fractions up to a specified temperature. The cumulative weight fraction is 1.00 for the whole temperature range.

The highest temperature fraction molecular weight, MW (Highest Temperature Fraction), is defined as the molecular weight calculated at the highest temperature containing more than 1.0 wt % material. The MW Ratio of each temperature is defined as the MW (Temperature) divided by MW (Highest Temperature Fraction).

The present invention may be embodied in other forms without departing from the spirit and the essential attributes thereof, and, accordingly, reference should be made to the appended claims, rather than to the foregoing specification, as indicating the scope of the invention.

We claim:

1. An ethylene/alpha-olefin interpolymer, wherein the ethylene/alpha-olefin interpolymer has a CDBI of less than 60%, and wherein said ethylene/alpha-olefin interpolymer comprises at least two fractions in crossfractionation of the ethylene/alpha-olefin interpolymer, eluting from 85° C. to 90° C. and from 90° C. to 95° C., comprising a weight fraction ratio of >0.68 and a molecular weight homogeneity index of greater than 0.65; wherein the weight fraction ratio is the ratio of the weight of polymer in each fraction divided by the weight of polymer eluting between 95° C. and 100° C. and the molecular weight homogeneity index is the ratio of the weight average molecular weight of the polymer in the fraction divided by the weight average molecular weight of the polymer eluting between 95° C. and 100° C., and wherein said ethylene/alpha-olefin interpolymer has a density in the range of from 0.920 to 0.965 g/cm$^3$, and a melt index ($I_2$) in the range of from 0.5 to 100 g/10 minutes, and melt flow ratio ($I_{10}/I_2$) in the range of from 5.8 to 8.

2. A process to make the ethylene/alpha-olefin interpolymer of claim 1, the method comprising contacting ethylene with at least one alpha-olefin under suitable polymerization conditions with a catalyst composition to form the ethylene/alpha-olefin interpolymer.

3. A fiber comprising the ethylene/alpha-olefin interpolymer of claim 1.

4. The interpolymer according to claim 1, wherein the ethylene/alpha-olefin interpolymer has an average $M_v$ and a valley temperature between the low crystalline fraction and high crystalline fraction, $T_{hc}$, such that the average $M_v$ for a fraction above $T_{hc}$ from ATREF divided by average $M_v$ of the whole ethylene/alpha-olefin interpolymer from ATREF ($M_{hc}/M_p$) is less than 1.3.

5. The interpolymer according to claim 1, wherein said ethylene/alpha-olefin interpolymer has long chain branches less than 1 per 1000 C atoms.

6. The interpolymer according to claim 1, wherein said ethylene/alpha-olefin interpolymer has a molecular weight distribution, $M_w/M_n$, of less than about 5.

7. The process according to claim 2, wherein said catalyst composition comprises the reaction product of:
   (A) a magnesium halide prepared by contacting:
      (1) at least one hydrocarbon soluble magnesium component represented by the general formula R"R'Mg.xAlR'3, wherein each R" and R' are alkyl groups; and
      (2) at least one non-metallic or metallic halide source under conditions such that the reaction temperature does not exceed about 60° C.;
   (B) at least one transition metal compound represented by the formula Tm(OR)y Xy-x wherein Tm is a metal of Groups IVB, VB, VIB, VIIB or VIII of the Periodic Table; R is a hydrocarbyl group having from 1 to about 20, for example from 1 to about 10 carbon atoms; X is a halide, and $_y$ and $_x$ are integers and their sum is equal to 4, and
   (C) an additional halide source providing an excess X:Mg ratio.

8. The interpolymer according to claim 1, wherein the sum of the weights of all three fractions of polymer eluting between 85° C. and 100° C. is greater than 60 wt % of the ethylene/alpha-olefin interpolymer.

9. The interpolymer according to claim 1, wherein the weight average $M_w$ of the ethylene/alpha-olefin interpolymer is greater than 125,000 g/mol.

10. The interpolymer according to claim 1, wherein [Viscosity at 0.1 rad/s]/[Viscosity at 100 rad/s] of the ethylene/alpha-olefin interpolymer measured at 190° C. is less than 6.

* * * * *